(12) United States Patent
Newman

(10) Patent No.: US 9,864,074 B1
(45) Date of Patent: Jan. 9, 2018

(54) DIRECTIONAL PARTICLE DETECTOR WITH SHIELD AND SCINTILLATORS

(71) Applicant: David Edward Newman, Poway, CA (US)

(72) Inventor: David Edward Newman, Poway, CA (US)

( * ) Notice: Subject to any disclaimer, the term of this patent is extended or adjusted under 35 U.S.C. 154(b) by 0 days.

(21) Appl. No.: 15/595,467

(22) Filed: May 15, 2017

(51) Int. Cl.
  G01T 1/169    (2006.01)
  G01T 1/29     (2006.01)
  G01T 1/20     (2006.01)
  G01T 3/06     (2006.01)

(52) U.S. Cl.
  CPC ............ G01T 1/2907 (2013.01); G01T 1/169 (2013.01); G01T 1/2002 (2013.01); G01T 1/2018 (2013.01); G01T 3/06 (2013.01)

(58) Field of Classification Search
  None
  See application file for complete search history.

(56) References Cited

U.S. PATENT DOCUMENTS

| | | | |
|---|---|---|---|
| 3,047,721 A * | 7/1962 | Folsom ................. | G01T 1/2907 250/384 |
| 4,037,105 A | 7/1977 | Laurer | |
| 5,354,084 A | 10/1994 | Lofgren et al. | |
| 5,665,970 A * | 9/1997 | Kronenberg .............. | G01T 1/18 250/336.1 |
| 5,880,469 A * | 3/1999 | Miller ..................... | G01N 23/04 250/367 |
| 6,433,335 B1 | 8/2002 | Kronenberg | |
| 6,639,210 B2 | 10/2003 | Odom | |
| 7,521,686 B2 | 4/2009 | Stuenkel | |
| 7,745,800 B1 * | 6/2010 | McGinnis ................. | G01T 1/00 250/370.05 |
| 7,952,079 B2 | 5/2011 | Neustadter | |
| 7,994,482 B2 | 8/2011 | Frank | |
| 8,030,617 B2 * | 10/2011 | Enghardt ................ | G01T 1/167 250/367 |
| 8,067,742 B2 | 11/2011 | Winso | |
| 8,198,600 B2 | 6/2012 | Neustadter | |
| 8,247,776 B2 | 8/2012 | Peng | |
| 8,319,188 B2 | 11/2012 | Ramsden | |
| 8,866,100 B1 | 10/2014 | Marleau | |
| 8,930,165 B2 | 1/2015 | Vilim | |
| 9,012,855 B2 | 4/2015 | Speller | |
| 9,158,012 B2 | 10/2015 | Willis | |
| 9,575,189 B2 | 2/2017 | Groves | |

(Continued)

*Primary Examiner* — Edwin Gunberg

(57) ABSTRACT

A device that detects gamma rays or neutrons, and determines their source location, comprises two scintillator panels separated by a shield barrier. Particles incident from one side can fully strike the first scintillator, but are blocked by the shield from reaching the second scintillator. Particles from the other side can reach only the second scintillator. Thus the detector indicates the left-right direction for the source location quickly, and then with further data localizes the source precisely by analysis of the two opposite scintillator count rates versus angle, using methods disclosed. The detector enables rapid inspections of vehicles and cargo containers for clandestine radiological and nuclear weapons, and sensitive localization of radioactive material in a walk-through portal application. Detectors with such capabilities are essential for stopping nuclear and radiological terrorism.

16 Claims, 24 Drawing Sheets

(56) References Cited

U.S. PATENT DOCUMENTS

| | | | |
|---|---|---|---|
| 2002/0190861 A1* | 12/2002 | Wentworth | G08B 21/0216 340/568.1 |
| 2003/0165211 A1 | 7/2003 | Grodzins | |
| 2005/0121618 A1 | 6/2005 | Fowler | |
| 2007/0221854 A1 | 9/2007 | Shirakawa | |
| 2008/0048123 A1 | 2/2008 | Larsson | |
| 2008/0136648 A1* | 6/2008 | Endrikhovski | G06F 11/1456 340/572.8 |
| 2013/0256538 A1* | 10/2013 | Vogtmeier | G01T 1/2006 250/366 |
| 2013/0329859 A1 | 12/2013 | Groves | |

\* cited by examiner

1100

1200

DIRECTIONAL PARTICLE DETECTOR WITH SHIELD AND SCINTILLATORS

CROSS REFERENCE TO RELATED APPLICATIONS

This application claims the benefit of U.S. Provisional Patent Application No. 62/464,778 entitled "Directional Neutron Detector" and filed on Feb. 28, 2017, and U.S. Provisional Patent Application No. 62/500,474 entitled "Directional Radiation Detector" and filed on May 2, 2017, the entire disclosures of which are incorporated by reference as part of the specification of this application.

FIELD OF INVENTION

The invention relates to particle detectors that indicate the direction of the particles or the location of a radiation source.

BACKGROUND OF THE INVENTION

Detection of smuggled nuclear and radiological weapons is an urgent national priority. All nuclear and radiological threat materials emit gamma rays or neutrons or both. However, radioactive materials may be shielded in various ways, and obfuscated among benign cargo, making them difficult to detect. An advanced detector such as a directional gamma ray or neutron detector is needed to reveal threat items rapidly and reliably. A directional detector would localize the threat material if present, and would also speed up the inspection process at shipping ports generally. The directional information would greatly enhance the statistical power of a radiation scan, since even a few particles coming from the same point in the cargo would reveal a hidden source, whereas a non-directional detector would require hundreds or thousands of additional detections just to raise a suspicion that some kind of radiation might be somewhere nearby. In addition, the entire inspection process would be speeded up, reducing inspection times and entry waits at shipping ports. Clean loads could be cleared more quickly. Any secondary inspections, when necessary, could then use the directional information as a time-saving starting point.

Since gamma rays are neutral, they are detected only when they interact with matter. Gamma interactions include photoelectric absorption in which the gamma is absorbed and a photoelectron is emitted, or Compton scattering which generates a Compton electron and a scattered gamma ray, or electron-positron pair production. In each case, the energetic electron (or positron) can be detected in a charged-particle detector such as a scintillator, which generates light when traversed by the energetic electrons. Gamma rays are attenuated by material, notably by high-density, high-Z material (Z being the atomic number) such as lead.

Neutrons are a critical signature of plutonium, the primary component of most nuclear weapons. The neutrons from spontaneous fission of plutonium typically have an energy of about 1 MeV, with a spread in energies from about 0.5 to about 5 MeV. Neutrons in that energy range interact with matter primarily by scattering from atomic nuclei in the matter. For most nuclei, the scattering can be either elastic or inelastic depending on the nucleus and other factors. But hydrogen is an exception because the hydrogen nucleus, a proton, has no excited states. Hence every n-p (neutron-proton) scattering in the MeV energy range is an elastic scattering. Energetic neutrons can be detected by n-p scattering, with recoil proton detection in a scintillator or other charged-particle detector. Low energy or thermalized neutrons can be detected by neutron capture in a nucleus, such as $^{10}B$ or $^{6}Li$, which then emits energetic ions that can be measured by scintillators. Thus a multi-purpose scintillator such as a boron-loaded plastic scintillator can detect gamma rays, energetic neutrons, and thermalized neutrons according to the various interaction processes listed.

Prior-art directional gamma ray detectors have usually employed collimators such as pinhole or multi-channel collimators, or coded-aperture masks. Such systems are notoriously inefficient since most of the gamma rays are absorbed in the collimator. Various semi-collimators such as movable baffles and shields have been offered, but they provide very limited angular resolution, truncated field of view, low efficiency, or cumbersome and expensive mechanicals. Other prior-art directional detectors use elongate scintillators or semiconductor detectors shaped to provide an angular dependence on detection, generally resulting in low efficiency and/or poor angular resolution. Tracking-type detectors form an image of the gamma-generated electron track or the neutron-generated recoil proton track. Tracking detectors such as proportional chambers, spark chambers, and bubble chambers are big, heavy, expensive, complex systems unsuitable for field applications such as a vehicle scanner.

What is needed is a compact, solid-state detector that indicates the direction of the incident particle, providing sufficient angular precision to localize the source, rapidly and at high efficiency, and preferably with low cost.

SUMMARY OF THE INVENTION

The invention is a device that detects particles (principally gamma rays or neutrons) from a radioactive source, and also indicates a direction related to the particles, such as the particle velocity direction or the location of the source of particles. The inventive device comprises two scintillators, a barrier or shield, one or more light sensors, and an electronic processor. Each scintillator is a substantially planar body of material that emits a light pulse when traversed by a charged particle, such as a charged particle generated by a neutron or gamma ray interaction. The shield is a substantially planar body having two opposite parallel surfaces, and comprising a material that blocks or attenuates the particles. The first and second scintillators are positioned parallel to the shield, and are closely proximate to, or substantially in contact with, the two opposite surfaces of the shield respectively. Thus the first scintillator, the shield, and the second scintillator form a "sandwich" structure with the three components all parallel and tightly packed together. Each light sensor comprises a transducer configured to generate a first electrical signal responsive to a first light pulse from the first scintillator, and a second electrical signal responsive to a second light pulse from the second scintillator, and further includes sufficient electronic or optical components to discriminate light pulses from the two scintillators. The processor comprises a digital computing device or logic array, configured to analyze the signals and calculate the direction of the particles or the location of the radioactive source.

As used herein, a "substantially planar body" is an object that has (a) a thickness comprising its smallest dimension, (b) two lateral dimensions each of which is at least twice as large as the thickness, and (c) two substantially flat surfaces which are orthogonal to the thickness dimension and are parallel to each other; for example, a slab. The sensor "discriminates" the first and second light pulses by generating the first and second signals so as to identify whether they are associated with the first or the second scintillator;

for example the signals having a distinct shape, or appearing on separate conductors, according to which scintillator emitted the light pulse. The shield "attenuates" particles by absorbing, blocking, scattering, or reducing the energy of the particles sufficiently that the scintillators cannot subsequently detect them; such as lead attenuating gamma rays, or cadmium attenuating neutrons. The detector has a "detector plane" which is a plane passing through the center of the detector and parallel to the shield surfaces.

The directionality of the inventive detector arises from the relative geometrical positions of the scintillators and the shield. Particles arriving from a particular angle will fully strike the first scintillator they encounter, but are blocked by the shield from reaching the second scintillator. Particles arriving from the opposite direction are counted only in the second scintillator, for the same reason. And if the source is directly aligned with the detector plane, then the particles strike the two scintillators equally. Designs are presented below demonstrating high contrast between the two scintillators, high detection efficiency, and high angular resolution. When operated, the invention quickly provides a general left-right indication of the particle directions, and then with further angular measurements and analysis, the invention indicates the source location directly.

The inventive shield must have opposing flat parallel faces so that the detector plane is well-defined. The detector also has a front face, which is a plane orthogonal to the detector plane and coincident with the leading edges of the scintillators. Thus the scintillators are bounded by the front face of the detector. Preferably the shield protrudes distally beyond the front face (beyond the scintillators), and preferably the protrusion distance is about equal to the thickness of the first or second scintillator. The shield protrusion improves performance by preventing particles at oblique angles from striking the downstream scintillator, and also sharpens the directional response of the system, while still not obstructing either scintillator when the detector plane is properly aligned with the source.

As an option, the shield may itself comprise a third scintillator producing a third light pulse such that the sensor generates a third signal distinct from those of the other two scintillators; hence the third scintillator signals can be counted separately. The third scintillator may indicate the particle flux or other data.

As a further option, the shield may comprise a pair of parallel layers of non-scintillating shield material, spaced apart, with a third scintillator positioned between them. In this case the third scintillator is shielded on both sides by the two shield layers. The third scintillator provides directionality data independent of the first and second scintillators. The third scintillator may also be a spectrometer-type detector that measures the total energy of the particles, thereby identifying the radioactive source material.

The inventive detector can measure the direction of any type of particle, including neutrons and gamma rays as well as charged particles, so long as the scintillator and shield materials are chosen appropriately. The same operational steps are involved in operating the invention, and the same analysis steps in analyzing the data, regardless of the type of particle.

For gamma ray detection, the shield preferably comprises a high-density, high-Z material such as lead, tungsten, uranium, or bismuth; however a low-cost dense material such as steel may also serve if sufficiently thick. The scintillators for gamma ray detection comprise any material that emits light when traversed by a gamma-generated electron such as a Compton-scattered electron. For convenience and low cost, organic scintillators such as plastic PVT-based scintillator, anthracene, stilbene and the like are suitable. For compactness and high efficiency, the scintillators may comprise a high-density material such as NaI(Tl), $CaF_2(Eu)$, or BGO. However, certain nonlinear scintillators that are relatively insensitive to the low-ionization-density tracks of gamma-generated electrons, such as ZnS(Ag), would not be suitable for detecting gamma rays.

For detection of energetic neutrons, such as those emitted by nuclear weapon materials, the shield and the scintillators preferably use n-p scattering. The scintillators are preferably hydrogen-rich (at least 50% hydrogen by composition or number of atoms), thereby offering abundant scattering nuclei, and the recoil proton is then detected in the same scintillator. Any organic scintillator is suitable for fast neutrons. Alternatively, an inorganic scintillator such as ZnS(Ag) will do as well, if intermingled with a hydrogenous binder such as acrylic. The fast-neutron shield material is also preferably dense and hydrogenous (at least 50% hydrogen), such as HDPE (high-density polyethylene, which is 67% hydrogen). The fast neutrons then scatter in the shield material until their kinetic energy is low enough that they cannot generate detectable signals by n-p scattering in the scintillators. Since detection is based on recoil protons, it is sufficient to degrade the neutron energy low enough that any further scattering in the scintillators would produce insufficient light to be counted. It is not necessary to actually stop or absorb the neutrons in the shield, since typically only two or three n-p scatterings in the shield are sufficient to bring the neutron energy below a threshold cut. Nevertheless, the shield may be loaded with lithium to absorb the de-energized neutrons.

For detection of thermal and epithermal neutrons, the invention operates by neutron capture reactions that generate energetic ions. Preferred reactions are $^{10}B(n,\alpha)^7Li^*$ or $^6Li(n,t)^4He$, where $\alpha$ is an alpha particle and t is a triton. The energetic ions are then detected in the scintillator. The capture cross sections of these nuclei are very large only for low-energy and thermal-energy neutrons; hence the need for thermalization. If the neutrons are very low energy or thermal, less than 1 eV typically, then the neutrons would require no further thermalization, in which case a non-hydrogenous scintillator such as lithiated or borated glass scintillators would be suitable.

But if the neutrons are epithermal or keV-range energy, then a hydrogenous organic scintillator doped with lithium or boron would be preferred, so that the hydrogen can finish the thermalization and thereby promote the capture reaction in the lithium or boron. A suitable shield material for low-energy neutrons is again polyethylene, or other high-hydrogen polymer, however in this case it must be combined with nuclei that have a high capture cross section such as gadolinium, boron, lithium, or cadmium. Optionally, the slow-neutron shield may comprise a central layer of polyethylene surrounded by a film of neutron-capture material with sufficient thickness to pick up any remaining neutrons before they can escape to the adjacent scintillators. Unlike the fast-neutron case, the shield for low energy neutrons must capture the thermalized neutrons in the shield, otherwise they would interact with the capture-nuclei in the scintillators and produce false counts.

The scintillators may be of any thickness. The best angular resolution is obtained when the thickness of the scintillator is substantially less than its lateral dimensions; however adequate detection efficiency requires that the scintillators be as thick as possible. Therefore the optimal scintillator thickness is a compromise between angular resolution and detection efficiency. The optimal shape depends on the size and material properties of the scintillator, the particle energy, and the shield properties. Good performance can usually be obtained with a scintillator thickness in the range of 0.1 to 0.5 times the lateral dimensions of the scintillator.

The shield may also have any thickness. Preferably the shield is thick enough to attenuate most of the incident particles, but not so thick that the detector becomes too heavy for precise handling. Thus the shield shape is a compromise between the signal contrast (the maximum difference between the first and second scintillator counting rates) versus the weight of the system. Typically a contrast of at least two is necessary, or three for improved responsiveness, while four is sufficient for most applications; and always the higher the better. Artisans may wish to model their design using software such as MCNP.

As mentioned, the sensor includes a transducer that receives the scintillator light pulse and responsively generates an electronic signal related to the light pulse. The sensor may also include an optical or electronic means for distinguishing the signals from the first and second scintillator (and the third scintillator, when present). For example, in configurations that use wavelength discrimination to discriminate the two scintillators, the sensor includes an optical filter to pass only the light from one of the scintillators. In configurations employing pulse-shape discrimination, the sensor includes electronics to separate short-duration and long-duration pulses. For configurations wherein each scintillator is viewed by a separate sensor (that is, "light-path discrimination"), the resulting signals appear on different conductors and hence are automatically distinct. An advantage of pulse-shape discrimination is that the detector can use just a single sensor, lowering costs. An advantage of wavelength discrimination is that the optical filters, particularly of the dichroic type, can be configured to reflect the out-of-band light so that the other sensor can receive it. An advantage of light-path discrimination is that the scintillators can both be made of the same type of material, thereby simplifying construction and ensuring that they have similar detection efficiencies.

The transducer is any light-sensitive device that generates an electronic signal responsive to light from the scintillators. A photomultiplier is best, although a solid-state sensor such as an avalanche photodiode or SiPM may also serve, and is more compact. For pulse-shape discrimination of the scintillators, the sensor must be fast enough to differentiate the two scintillator light pulses. If wavelength discrimination or light-path discrimination is used, speed is less of an issue, although the noise level of a solid-state sensor may be a problem, depending on the brightness of the scintillators and the light collection efficiency.

The inventive sensors may include light guides that convey scintillation light from the scintillators to the transducer elements. An advantage of using light guides is that the scintillation light can be collected more uniformly from the entire scintillator area, thereby improving detection efficiency. Another advantage is that the light sensor can be positioned some distance from the scintillators, thereby preventing material from getting in the way of the incoming radiation. Another advantage is that accessories such as magnetic shields can usually be accommodated more easily when light guides are used, due to the increased design flexibility.

When both scintillators are to be viewed by the same sensor (as in the pulse-shape-discrimination versions), the two light guides generally come together and couple the light from the two scintillators into the same sensor. Multiple sensors may also be used, but each one is coupled to both of the light guides. In other versions, such as the light-path-discrimination version, the two scintillators are viewed by two separate sensors, in which case each light guide is wrapped in such a way that light from one scintillator is unable to reach the opposite sensor. Reflective and opaque foils may be added to ensure this.

The inventive processor comprises a digital calculating device or array of logic elements, configured to process the sensor output signals and determine an angle or direction related to the incident particle, such as the particle's direction or the location of the source. Preferably the processor is programmed to perform one or more of the inventive angular analysis methods detailed below. The processor may further indicate the directional results using a human-readable display, or store results in a non-transitory computer-readable record, or communicate results to an external computer.

The processor may comprise a computer or CPU or GPU or the like. Such a processor may be separate from the rest of the detector, communicating with the sensor or sensors, and may be configured to analyze data from multiple detectors at once. Or, the processor may be an embedded device such as a microcontroller or ASIC or DSP or gate array, or other calculating device integrated with the rest of the detector and programmed to implement analysis methods such as the inventive angular analysis methods disclosed below. The processor may comprise logic elements such as AND, OR, XOR gates and the like, in TTL or CMOS or other technology, and configured or wired to indicate the direction of the particles according to the scintillator signals. Typically the processor further includes means for displaying or recording or communicating the results of the analysis, such as a display screen or LED's on a portable detector, or a sonic alarm on a walk-through portal at a reprocessing center, or a non-transient computer-readable record on a computer at an inspection facility for example. The processor may also display a still image or video of the scene, with the suspected source location demarked by a colored patch or crosshairs or other marking. An illuminator such as a low-power laser pointer may be mounted on the detector so as to show where a source is localized, which would greatly assist the secondary inspection team to quickly clear any alarms.

Operation of the inventive detector is very simple. To detect and localize a source which is initially at an unknown location, the detector is first positioned with the detector plane vertical, and with the detector angle at some arbitrary first angle. Particles incident on the detector are mainly detected in the scintillator that faces the source, since the opposite scintillator is blocked by the shield. The detector thus observes a higher detection rate in one scintillator than the other, and therefore indicates that the source is most likely on the side of the higher-detection scintillator. The detector is then rotated in the direction of the high-counting scintillator by some amount, typically 30 or 45 degrees. Then at that second detector angle, the scintillator counting rates are again measured, and again the device indicates whether the source is to the left or right. The detector is then rotated by a smaller amount, perhaps 10 or 15 degrees. Continuing in this fashion, the detector quickly iterates into the vicinity of the source direction. With each new data point, the inventive processor updates the analysis and reports the most likely azimuth of the source, preferably along with its uncertainty. As further angles are interrogated, and especially as those angles approach closer to the actual source location, the uncertainty in the source location is rapidly reduced.

It may be noted that, when the inventive detector is perfectly aligned with a source, the detector cannot tell whether the source is in front or behind the detector, due to symmetry. However this is easily resolved by rotating the detector a few degrees left or right and noting which of the two scintillators shows an increase in count rate. This step quickly and unambiguously determines whether the source is in front or behind the detector. Usually this is not an issue because the detector starts out non-aligned with the source, and therefore can determine from the first two data points whether the source is in front or behind.

The invention includes algorithms or methods to determine the source direction from the scintillator signals. Four analysis algorithms are presented herein. In a first analysis algorithm, termed the "equal-rates" method, the detector is rotated horizontally (that is, "yawed") while the two scintillator counting rates $R_1$ and $R_2$ are monitored. The iterative rotations are then continued, always rotating toward the higher of the two scintillator rates, until the two counting rates are substantially equal. At that angle, the detector plane is aligned with the source.

The detector can also determine the elevation angle of the source. First the detector is re-oriented ("rolled") until its detector plane is horizontal, and then is rocked vertically ("pitched") until the two counting rates are again equal.

A second angle-analysis method, termed the "half-max" method, provides an alternative and statistically independent measure of the source direction. Here the detector is rotated first to large angles, plus and minus, to determine a maximum and a minimum counting rate for each scintillator. (The maximum counting rate is usually obtained when the scintillator faces the source, and the minimum is found when it is 180 degrees away from the source.) Then the detector is rotated back until the counting rate of the first scintillator $R_1$ is half-way between the maximum and minimum counting rates for that scintillator. The angle at which the first scintillator counting rate is half-way between the maximum and minimum counting rates for that scintillator is termed $\theta_1$. Then the same procedure is repeated for the second scintillator, thereby determining the half-max angle $\theta_2$. Then, the source angle $\theta_s$ is found as the average: $\theta_s=(\theta_1+\theta_2)/2$. An advantage of the half-max method is that it does not depend on the detection efficiencies of the two scintillators being equal, since the method uses each scintillator's actual maximum and minimum counting rates in the analysis.

The invention includes a third angle-analysis algorithm termed the "zero-cross" method, in which the two scintillator detection rates are subtracted one from the other, and the difference is fit to a sigmoid curve. The most likely source azimuth is the particular angle at which the fit curve passes through zero. An advantage of the zero-cross method is that it provides a precision result using just a few measurement points. Conveniently, it does not depend on aiming the detector directly at the source, so long as the curve fit is sufficient. As an option, the detector may be rotated to the predicted source angle, and then a final data point acquired there, after which the fit parameters are updated. The zero-cross method is statistically independent of the equal-rates method because the equal-rates method depends on finally pointing the detector directly at the source, whereas the zero-cross method uses the data from a variety of angles in a global curve fit.

The invention includes a fourth angle-analysis method, termed the "peak-detect" method, in which the two counting rates $R_1$ and $R_2$ are functionally combined so as to maximize their mutual sensitivity at those few angles where both scintillators are active, hence producing a peak at exactly the source direction. One such function is simply $R_1 \times R_2$, the product of the two counting rates, although many other functions are possible depending on the particular size and shape and composition of the scintillators. A localized source generates a pronounced peak in the angular distribution, centered exactly at the source angle. As with the zero-cross technique, it is not necessary to exhaustively scan the angular values, but rather to acquire a few widely spaced measurements. The two highest values likely belong to the peak, and so a new angle is calculated by interpolating between them. After finding such an interpolated angle, the detector may optionally be rotated to that calculated angle, and a final data point acquired, and the interpolation repeated using the new maximum points. The final result is reported as the predicted source direction.

The results of all four analysis methods may be compared. If the source is highly localized, the four results should be in close agreement. If the various methods differ, this means that the source consists of multiple localized sources or a distributed radioactive mass. Inspectors may appreciate knowing that before going any closer.

As a further option, the invention may comprise an array of directional detectors, each detector in the array being mounted in a different position and aimed in a different fixed direction. The counting rates in the two scintillators of each detector in the array are then compared. The data from the various detectors at different angles, is equivalent to a single detector being successively rotated to the different angles, thereby localizing the source. However, the array does it all in parallel, so the source direction is determined much faster than with a single detector.

The array may be a set of detectors spread out horizontally, with each detector aimed at a different horizontal angle, thereby determining the horizontal angle or azimuth to the source. To avoid the detectors shadowing each other, a space or gap should be arranged horizontally between each pair of detectors.

Alternatively the array may be positioned vertically, but still viewing different horizontal angles. In that case there is no need to leave a space between the detectors, since the range of viewing directions is orthogonal to the positions.

The array may include both azimuthal angles and elevation angles, thereby obtaining a full two-dimensional scan all at once. The array may further include widely-spaced detectors so that the distance of the source can be determined by comparing the angles found from detectors at different positions. For example, a large container or vehicle could be scanned all at once using a wall or tunnel of the inventive detectors, each detector being at a different position and all pointing in different directions.

The invention may or may not include means for determining the current detector angle, depending on the specific application and design. Some of the analysis methods, such as the "zero-cross" method, require that the scintillator data be compared at different detector angles, and therefore the detector angle must be known along with each set of scintillator rate data. The current detector angle can be obtained in many ways, such as a built-in compass device of the kind found on many smartphones, or from image processing of a video of the scene as the detector is rotated (using a miniature camera built into the detector for example), or by reading an optical encoder plate in a fixed position, of which many types are known. If the rotation is controlled by a servo motor, the commanded angle of the servo can be used as the presumptive detector angle. Many other means for determining the detector angle are available.

In other embodiments, there is no need to measure the current detector angle at all. For example, the detectors in an array may be fixed at specific angles which are predetermined and unchanging. Alternatively, the detector may comprise a handheld survey meter that indicates in real time whether the source is left, right, or straight ahead, while the operator moves the meter around at will. The processor is a simple comparator in that case, and there is no need to correlate scintillator data at different angles, and therefore no need to determine the current value of the detector angle.

In some embodiments, the detection efficiencies of the two scintillators are different, particularly if the first and second scintillator are made from different materials. In that case the scintillator efficiencies are preferably calibrated, for example with a radioactive source using techniques well known to artisans. Then the symbols $R_1$ and $R_2$ are taken to represent the calibrated counting rates, which are obtained for example by dividing the raw counting rates by the measured efficiencies of each detector. Artisans can also measure and correct for the "shape factor" of each scintillator, which is the ratio of the scintillator detection rates face-on versus edge-on toward a source. For example, small and low-efficiency scintillators tend to have about the same counting rate regardless of orientation and thus have a shape factor of about 1.0, while a large, high-density, elongate scintillator may have a significantly lower counting rate edge-on, due to absorption in the scintillator material.

The invention may be configured to discard or veto any events caused by cosmic rays. Typically cosmic rays penetrate all the way through the detector, so any event in which more than one scintillator is active at the same time, or within a time window that depends on the pulse decay time of the scintillators, would be rejected. Occasionally a cosmic ray may pass vertically through a scintillator without triggering an adjacent scintillator, in which case it would generate a huge light pulse (corresponding to 10-20 MeV typically) which could be rejected on pulse height alone. Occasionally, both scintillators may be triggered at once by the particles that the invention is intended to detect, for example due to double scattering; but this is rare since it requires the particle to interact with both scintillators and also penetrate through the shield.

The invention provides many advantages over prior-art directional detectors. (a) The inventive detector achieves high detection efficiency because the arriving particles always encounter a scintillator first, before reaching the shield. Particles are blocked by the shield only if they pass through the initial scintillator. Hence the invention provides the same high detection efficiency as an unobstructed scintillator viewing the incoming particles. Prior-art collimated detectors, on the other hand, universally place the collimator ahead of the scintillator, and therefore lose most of the incident particles in the collimator. (b) The invention detects particles from all directions at all times. Prior-art directional detectors with a similar $4\pi$ capability are large complex tracking-type detectors costing orders of magnitude more than the inventive system. (c) The invention provides high angular precision when the inventive methods are applied. Prior-art directional detectors based on the shape effect of elongate scintillators cannot match the localization results of the inventive system. (d) The invention is compact, low-cost, easy to implement in an inspection environment, suitable for large-scale cargo and vehicle scanning, and virtually immune to defeat by conventional shielding or obfuscation techniques.

DETAILED DESCRIPTION OF INVENTION

The inventive detector is a geometrical radiation-source direction-finder based on an occluding shield flanked closely by two scintillators. Particles, particularly gammas or neutrons, arrive at the detector from a radioactive source at an unknown location. The arriving particles can strike one of the scintillators directly, and are prevented from reaching the opposite scintillator by the shield. Particles arriving from the opposite side are likewise able to reach only the second scintillator. Signals from the two scintillators thus reveal the general left-or-right direction of the gamma source relative to the initial detector plane. Then, by rotating the detector in the direction indicated by the active scintillator, the detector can be brought into closer alignment with the source. The source can then be localized with high precision, using methods that exploit the parallel-planar symmetry of the detector.

Optionally, the shield may protrude beyond the edges of the scintillators. This results in improved angular resolution and reduced cross-talk. The shield may itself comprise a third scintillator. Alternatively, the shield may comprise two spaced-apart layers, with a third scintillator positioned between the two shield layers.

The detector discriminates signals from the two scintillators, using for example pulse-shape discrimination, wavelength discrimination, or light-path discrimination. The invention may comprise an array of multiple detectors oriented in different directions, thereby enabling rapid and simultaneous evaluation of particle directions. A wall or tunnel or other widely distributed array of directional detectors can simultaneously and quickly scan a large object, indicating the radioactive source locations in 3-D, as well as its intensity (net of any shielding), and (with options) the isotope mix. The inventive detector facilitates detection of clandestine radiological and nuclear weapon materials in vehicles or shipping containers, and in a walk-through portal, in a hand-held survey meter, and in a mobile array for area searches.

Figure 1:
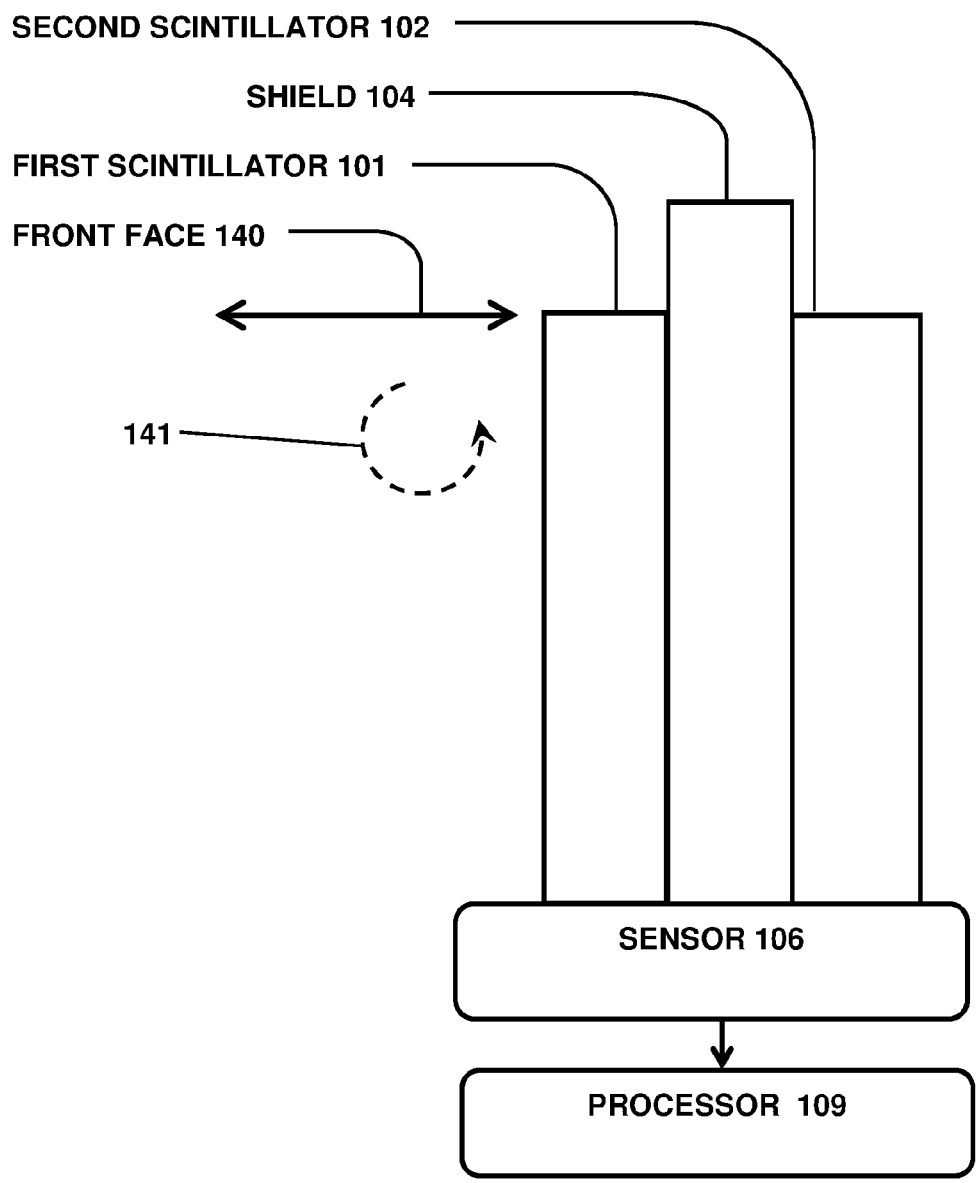
FIG. 1 is a sketch in cross-section of a detector according to the invention comprising a first scintillator, a shield, a second scintillator, a light sensor, and a processor. The detector is pointing up. The front face of the detector is at the top of the sketch. The shield protrudes beyond the scintillators. Signals from the two scintillators are distinguished by pulse-shape discrimination.

FIG. 1 is a top-view cross-section sketch of a basic version of the inventive detector, comprising a first scintillator 101 and a second scintillator 102 positioned closely proximate to the two opposite sides of a slab-like shield 104. The scintillators 101 and 102 are directly coupled to a light sensor 106. The detector is facing upwards in the sketch. Signals from the two scintillators 101 and 102 differ in their pulse shapes or durations, and are thereby discriminated by pulse-shape discrimination electronics included in the sensor 106, which then sends a first or second type of electrical signal to the processor 109 indicating which scintillator 101 or 102 was hit. The front face of the detector is indicated by the double-arrow 140 which demarks the edges of the scintillators 101 and 102. The shield 104 protrudes beyond the front face 140 by a distance, in this case equal to the thickness of the first scintillator 101.

Operation of the detector of FIG. 1 is straightforward. The detector is rotated around an axis orthogonal to the page, as indicated by the dashed arrow 141, to determine the detection rates versus detector angle. Gamma rays or neutrons incident from the left are likely to interact with the first scintillator 101, and are blocked by the shield 104 from reaching the second scintillator 102. Particles from the right are detected in the second scintillator 102 and are blocked from reaching the first scintillator 101. If the source (not shown) is located directly in alignment with the detector (that is, at the top of the page in this top-view diagram), then the particles would be equally likely to strike the two scintillators 101 and 102.

The detector of FIG. 1 is an example of the pulse-shape-discrimination version of the invention. The scintillators 101 and 102 are made of different materials producing different-shaped light pulses. For detecting gamma ray sources, the first scintillator 101 may be a PVT-based plastic scintillator which has a pulse decay time of about 5 ns, and the second scintillator 102 may be LYSO or NaI(Tl) or the like with a pulse decay time of at least 200 ns, which is detectably different. The two pulse shapes can be reliably differentiated by electronics. The shield 104 may be any dense, preferably high-Z material such as lead, tungsten, bismuth, or uranium, or optionally steel. The sensor 106 is preferably a fast, sensitive phototransducer with sufficient time resolution to reliably differentiate the two pulse shapes. A photomultiplier tube is sufficient. An avalanche-type solid-state sensor such as a SiPM is likely fast enough, but may or may not have sufficiently low noise for reliable gamma counting, depending on the type of scintillator and the light collection. Possibly, several solid-state sensors could be attached to the scintillators 101 and 102, and their signals combined to suppress noise. Time-integrating pixel-type sensors such as CCD and CMOS-type arrays are usually not suitable for the pulse-shape-discrimination version because of insufficient time resolution.

The sizes of the scintillators 101 and 102, and of the shield 104, may be designed according to each particular application. For example, the thickness of the first scintillator 101 may be 2 cm, the second scintillator 102 may be 1 cm, and the shield 104 may be 1.5 cm. The scintillators 101 and 102 have the same depth of, say, 10 cm, while the shield 104 is 12 cm in depth, including the 2 cm protrusion beyond the front face 140 of the detector. (The "depth" of an item is its size in a direction orthogonal to the front face 140.) The length of the detector (the size in the direction out of the page) is not determined here, but may be 10-20 cm typically.

The detection efficiency of each scintillator 101 and 102 is determined by the size, shape, composition, and orientation of the scintillator relative to the particle direction and energy, as well as electronic settings related to the sensor 106. For example, considering a 1 MeV gamma ray incident orthogonally on the first scintillator 101 which is PVT, the mass attenuation factor of PVT is about 0.07 cm$^2$/g and the density is about 1 g/cm$^3$, therefore its thickness of 2 cm corresponds to a face-on detection efficiency of about 14% per incident gamma ray (assuming that Compton scattering is the main part of the mass attenuation factor at 1 MeV, and provided that pulse-height thresholds and the like in the sensor 109 are adjusted accordingly). If the detector is then turned 90 degrees so that the gamma ray approaches along the plane of the detector (that is, edge-on to the scintillators), the scintillator 101 then appears only one-fifth as wide (2 cm thickness versus 10 cm depth) and thus should intercept one-fifth as many gammas. On the other hand, each gamma would see five times as much interaction distance in the 10 cm depth, but this only partially cancels the one-fifth interception factor because some of the gammas are scattered or absorbed in the scintillator. Consequently, the shape factor is greater than 1. The net result is that the detection efficiency is about 25% lower when the scintillator 101 is aligned edgewise with the source versus orthogonal to it.

The second scintillator 102 has a much larger orientation difference since it is a much denser material, NaI in this example. The orthogonal or face-on detection efficiency is about 22%, while the edge-on efficiency including the reduced area is about 9%. The shape factor of each scintillator is known, or can be easily checked using radioactive sources. Therefore the angular dependence of the scintillator detection efficiencies may be removed in the directional analysis. However such a correction is not necessary if the inventive angular analysis methods are used, since they provide source location results independent of the scintillator shape factors.

The processor 109 receives the raw pulse data for the two scintillators and, with the detector angle, calculates a most probable azimuth for the source. The inventive analysis methods detailed below may be used, or another method may be used to calculate the source direction from the data.

As mentioned, the inventive configurations are also applicable to neutron detection instead of gammas. If the configuration of FIG. 1 is used for fast neutron detection, the two scintillators 101 and 102 should both contain hydrogen in order to provide proton-recoil targets. Two different plastic scintillators with different fluors having different decay times would be acceptable. The shield 104 for fast neutron detection should be HDPE (high-density polyethylene) or other high-hydrogen polymer. This does not stop or absorb the neutrons (aside from the occasional capture in hydrogen), but rather degrades the neutron energies by multiple elastic scattering. The shield 104 must be thick enough to bring the neutron energy low enough that they would not generate a detectable signal in the second scintillator, even if they scattered there.

The configuration of FIG. 1 may also be used to detect slow or thermal neutrons. Direct neutron capture reactions are used for detection instead of proton recoil. The two scintillators 101 and 102 should now contain capture targets such as boron or lithium, preferably enriched in $^{10}$B or $^{6}$Li, intermingled with the hydrogenous scintillator. For differentiation of the two scintillator signals, one scintillator could contain boron and the other could use lithium, and the different pulse heights (due to the different neutron-capture Q-values) would thus indicate which scintillator was struck. The shield 104 for slow neutrons may be HDPE doped with a capture nuclide such as lithium, or alternatively clad in a capture material such as cadmium or gadolinium. Unlike the case of high energy neutron detection, the shield 104 for low energy neutrons must actually absorb the neutrons, to prevent them from drifting into the scintillators and causing background counts.

The inventive detector, with materials selected according to the type of particle, can localize sources of gamma rays, fast neutrons, or slow neutrons, or any other type of incident particles. In each case, similar operational techniques and similar analysis methods are used for all particles, and similar directionality results are obtained regarding the source location.

Figure 2:
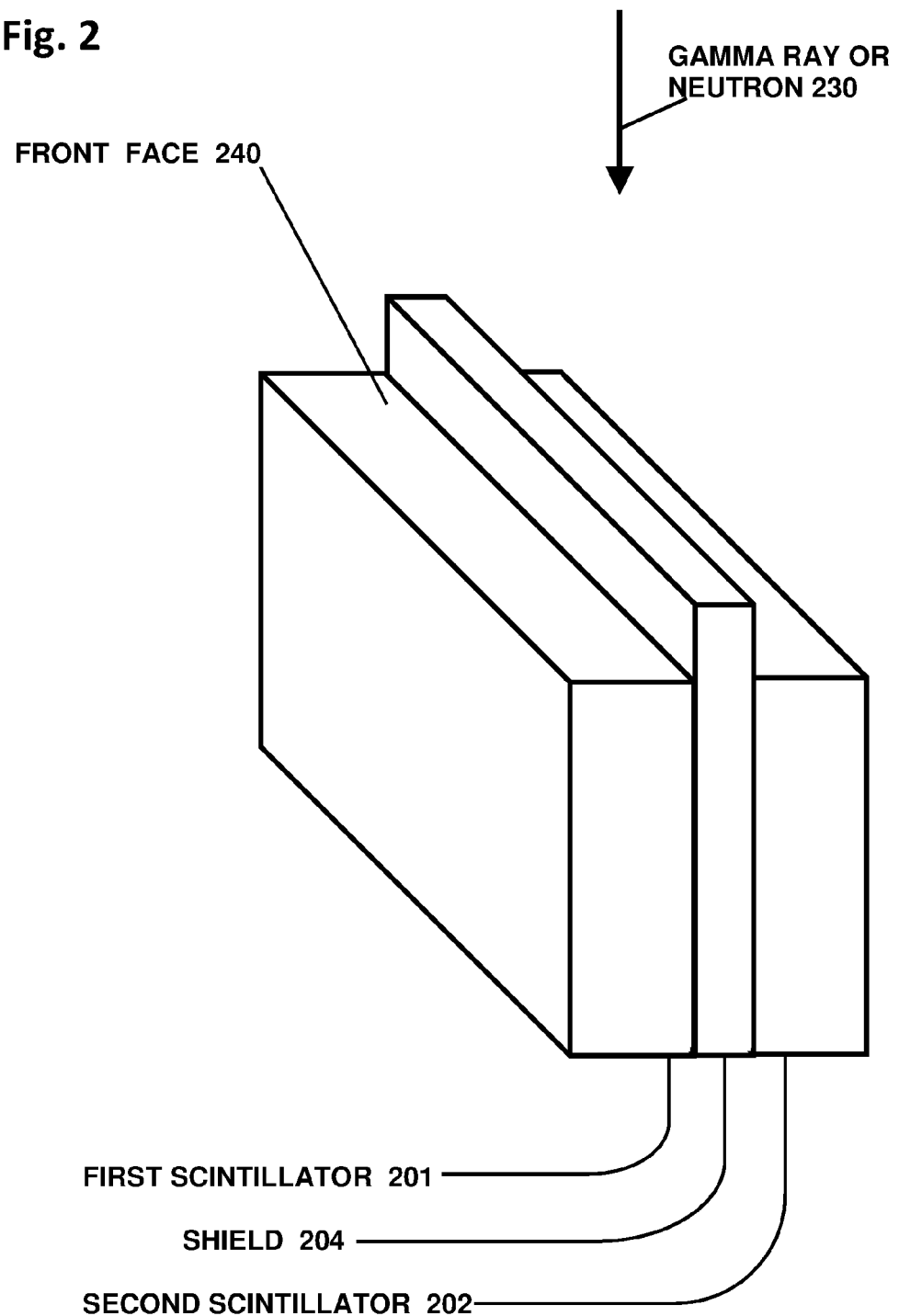
FIG. 2 is a sketch in perspective of the detector of FIG. 1, minus the sensor and processor. The detector is again pointing up.

FIG. 2 is a perspective sketch of the detector of FIG. 1, again pointing up. A neutron or gamma ray 230 is incident from a source (not shown) beyond the top of the page. The detector comprises a first scintillator 201, a second scintillator 202, and a shield 204. Each scintillator 201 and 202 is closely proximate to the shield 204, on opposite sides. Also, the front face 240 of the detector is indicated, being the boundary of the scintillators 201 and 202. The shield 204 protrudes distally beyond the front face 240 by a distance of roughly the thickness of one of the scintillators 201 or 202, thereby sharpening the angular dependence.

Figure 3:
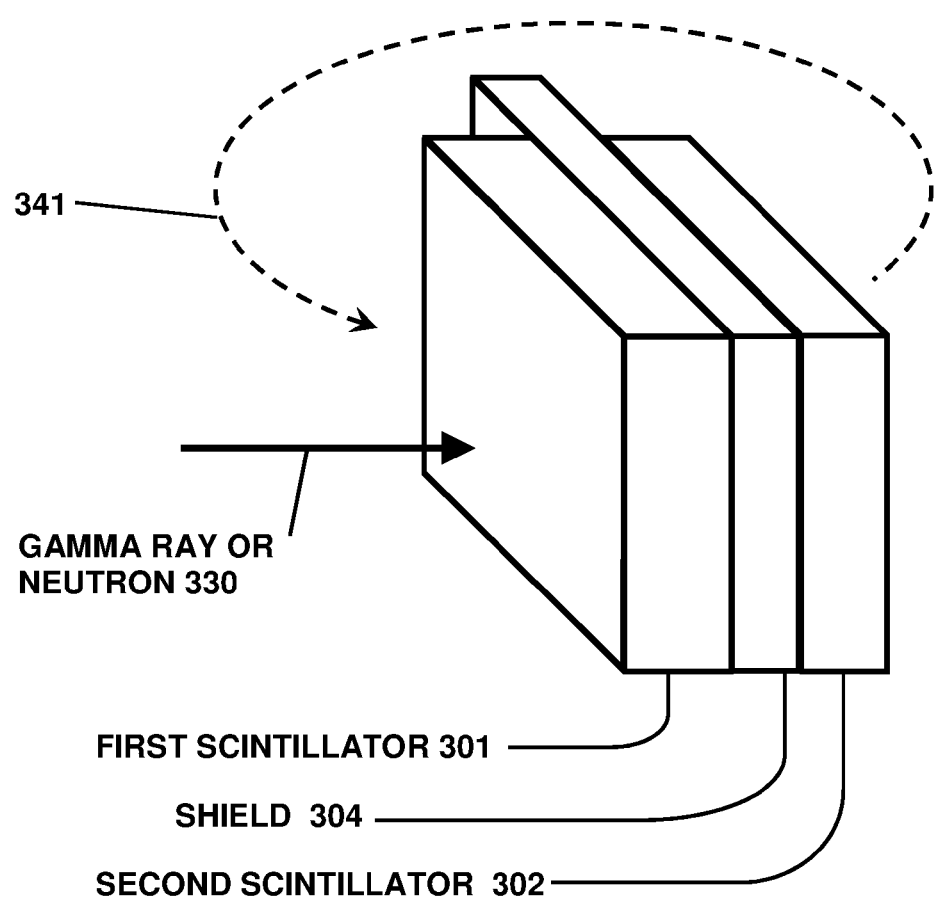
FIG. 3 is a perspective sketch of the detector of FIG. 2, viewed from behind, and showing how the detector may be rotated to determine the azimuth of an incoming particle.

FIG. 3 is a sketch in perspective of the detector of FIG. 1, now pointing away from the viewer, and with a gamma ray or neutron 330 approaching from the left. The detector comprises a first scintillator 301, a shield 304, and a second scintillator 302, in the stated order. In operation, the detector is rotated around a vertical axis, as indicated by an arrow 341, to find the azimuth of a source.

Figure 4:
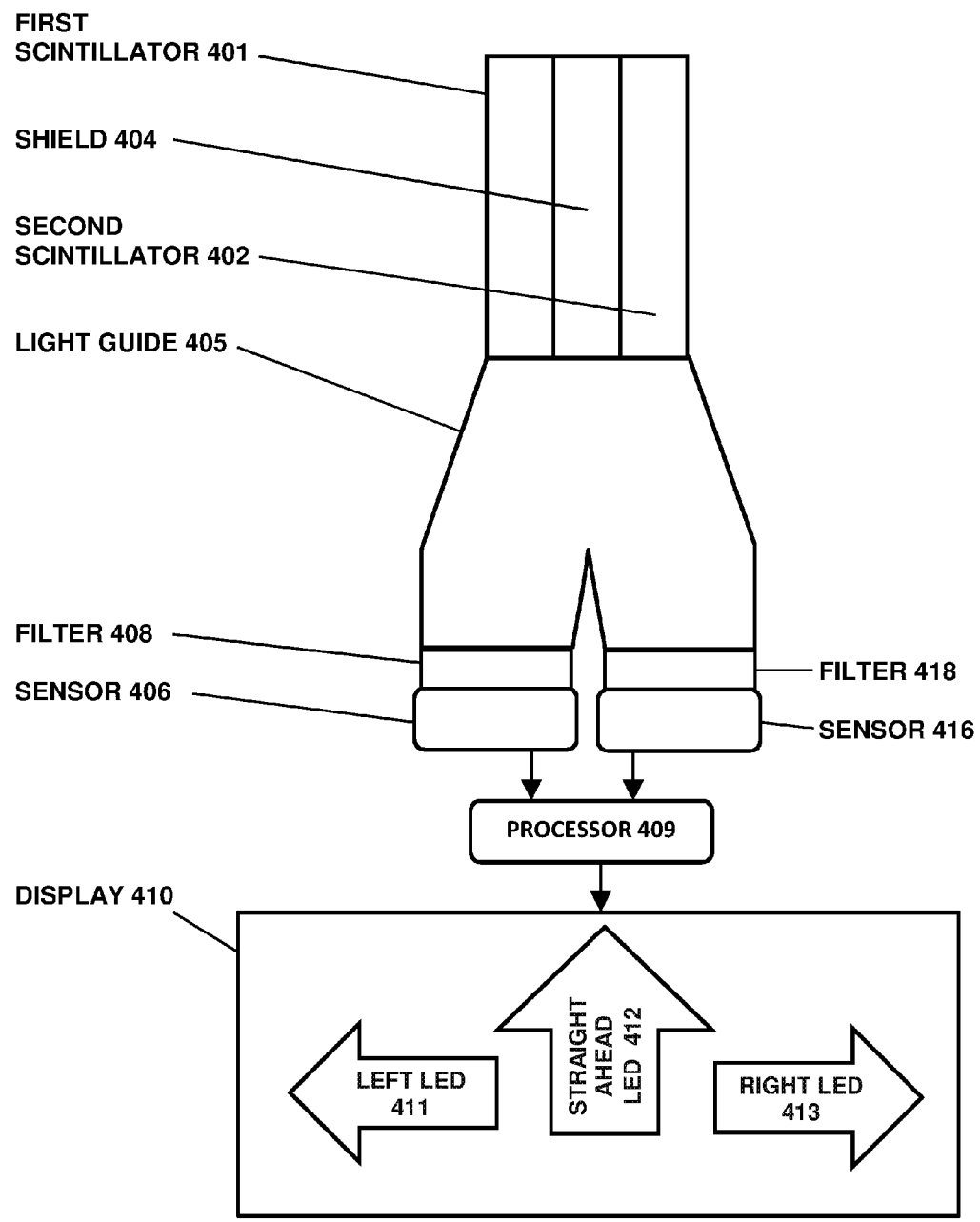
FIG. 4 is a sketch in cross-section of a detector according to the invention comprising a shield, two scintillators, a light guide coupled to two filters and two sensors with associated processor. The detector is pointing up. This version employs wavelength discrimination.

FIG. 4 is a cross-section sketch of the inventive detector, wavelength-discrimination version, in which a central shield 404 is adjacent to a first scintillator 401 on one side and a second scintillator 402 on the other side. The light from each scintillator 401 and 402 is captured by a light guide 405, which is coupled to two optical filters 408 and 418, which are coupled to two light sensors 406 and 416. Filter 408 passes the light of the first scintillator 401 while blocking or reflecting the light of the second scintillator 402, and vice-versa for filter 418. Thus sensor 406 detects only the light of the first scintillator 401 while sensor 416 detects only the light of the second scintillator 402.

Both sensors 406 and 416 then send signals to the processor 409, which calculates a direction related to a detected particle according to which scintillator 401 or 402 is active. The processor 409 then indicates the results of that calculation using a display 410 which includes a left LED 411, a right LED 413, and a straight-ahead LED 412, which may be shaped as arrows to assist the operator. For example, if the first scintillator 401 has a higher counting rate than the second scintillator 402, then the processor 409 may illuminate the left LED 411. If the second scintillator 402 is more active, the right LED 413 may be lit. And if the two scintillators 401 and 402 are about equally active, then the processor 409 may activate the straight-ahead LED 412, thereby finally localizing a radiation source.

Figure 5:
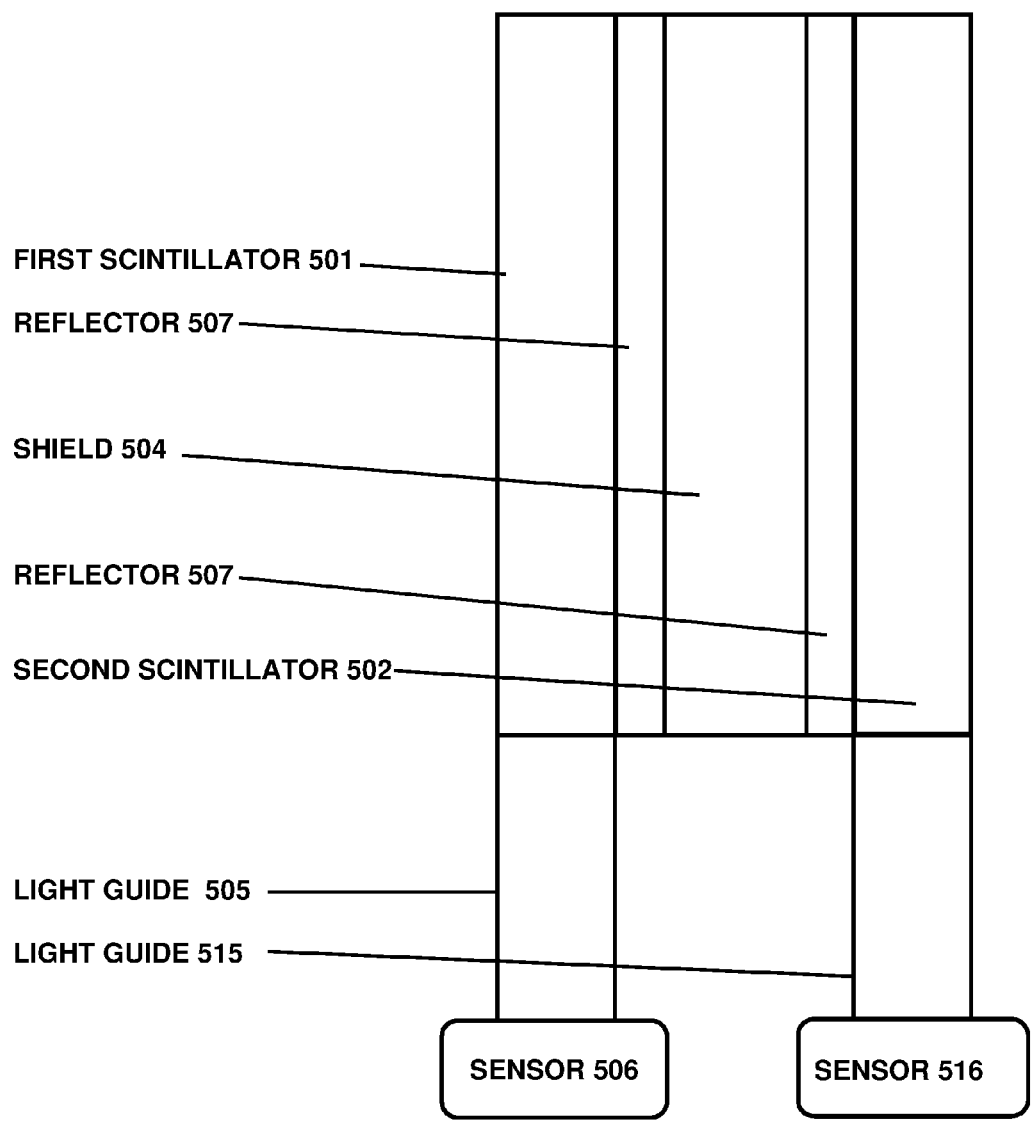
FIG. 5 is a sketch in cross-section of a detector according to the invention comprising a shield, two reflective layers adjacent to two scintillators, with two light guides leading to two sensors. This is an example of light-path discrimination.

FIG. 5 shows an alternative version of the detector using the light-path-discrimination option wherein each scintillator is viewed by a separate sensor. A central shield 504 is coated on both sides by reflectors 507, and the two scintillators 501 and 502 are on both sides outside the reflectors 507. Two light guides 505 and 515 escort the light from scintillators 501 and 502 to the two sensors 506 and 516 respectively. The reflectors 507 ensure that no light from one scintillator can reach the other sensor. Reflectors 507 are particularly needed if the shield 504 is transparent, such as lead glass for example. The reflectors 507 may also enhance light collection.

The advantage of light-path-discrimination is that the two scintillators 501 and 502 can be of the same type, simplifying construction. Another advantage is that both scintillators would have the same mass attenuation properties and the same shape factor, and presumably the same detection efficiency, which would simplify the angular analysis.

Figure 6:
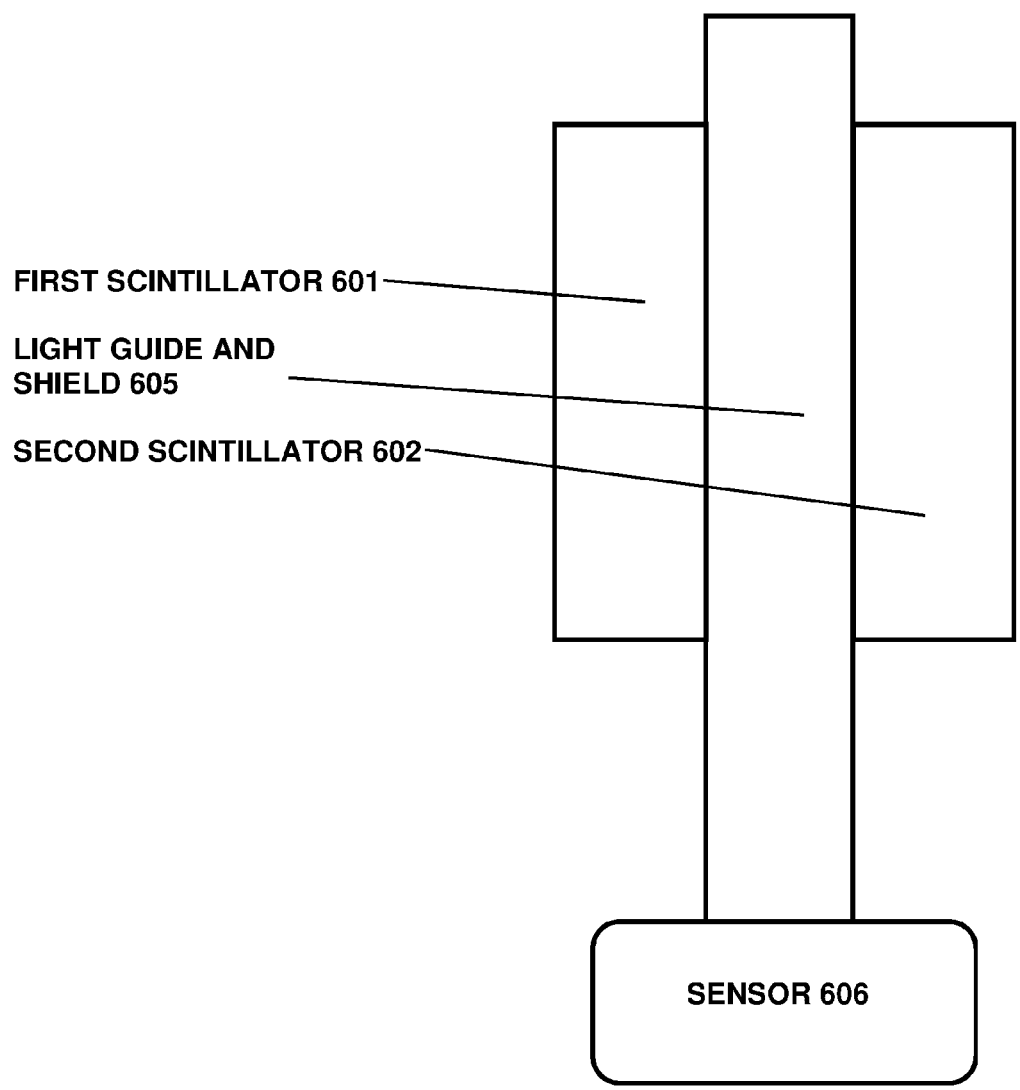
FIG. 6 is a sketch in cross-section of a detector according to the invention comprising a light guide which also serves as a shield, two scintillators, and one sensor coupled to the light-guide-shield.

FIG. 6 shows an alternative configuration of the inventive detector, but using a single central light guide 605 which also serves as the shield. The first scintillator 601 and the second scintillator 602 are optically coupled on both sides of the light guide shield 605, which conveys both types of pulses to the sensor 606. The two scintillator signals are then distinguished by pulse-shape analysis electronics which are included in the generalized sensor 606. If the particle type is a gamma ray, then preferably the light-guide-shield 605 comprises a dense, high-Z transparent material such as leaded glass. For neutrons, the light-guide-shield 605 may comprise cast polyethylene or other transparent polymer such as acrylic, and loaded with capture nuclei such as boron or lithium or gadolinium or cadmium. The advantage of the configuration of FIG. 6 is simplicity of construction and of handling, since there is only one light guide which holds the entire assembly together. The light-guide-shield 605 protrudes past the two scintillators 601 and 602. This is to improve the geometrical shadowing, since particles arriving at an oblique angle would likely be blocked before reaching the downstream scintillator, thereby enhancing left-right contrast.

Figure 7:
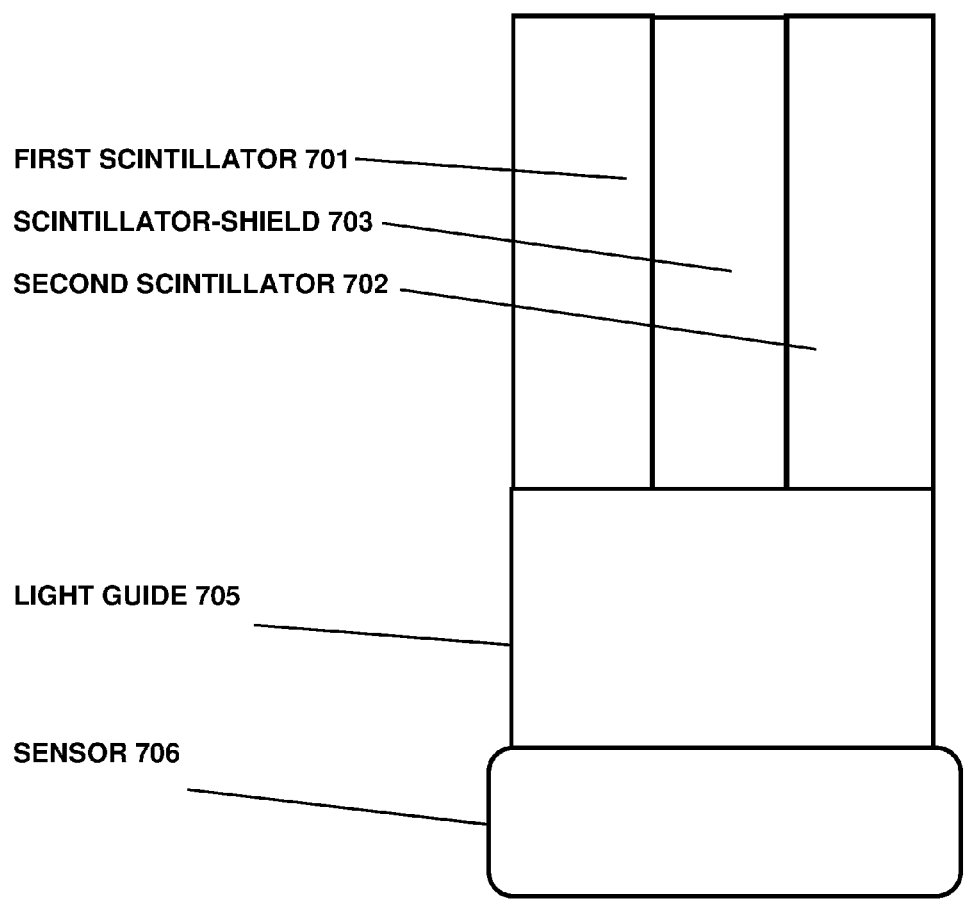
FIG. 7 is a sketch in cross-section of a detector according to the invention comprising a first and second scintillator, flanking a non-protruding shield comprising a third scintillator, all coupled by a single light guide to a sensor. This is an example of three-fold pulse-shape discrimination with a scintillator-shield.

FIG. 7 is a cross-section sketch of the invention with a scintillator-shield and three-fold pulse-shape discrimination. The third scintillator 703 is flanked by a first scintillator 701 and a second scintillator 702. Light from all three scintillators flows into a single light guide 706 and a light sensor 705. Three-fold pulse-shape discrimination can be done if the scintillator decay times are chosen carefully, such as plastic scintillator with 5 ns decay time, a second plastic scintillator with a different fluor decaying in 100 ns, and $CaF_2(Eu)$ scintillator with 900 ns.

Figure 8:
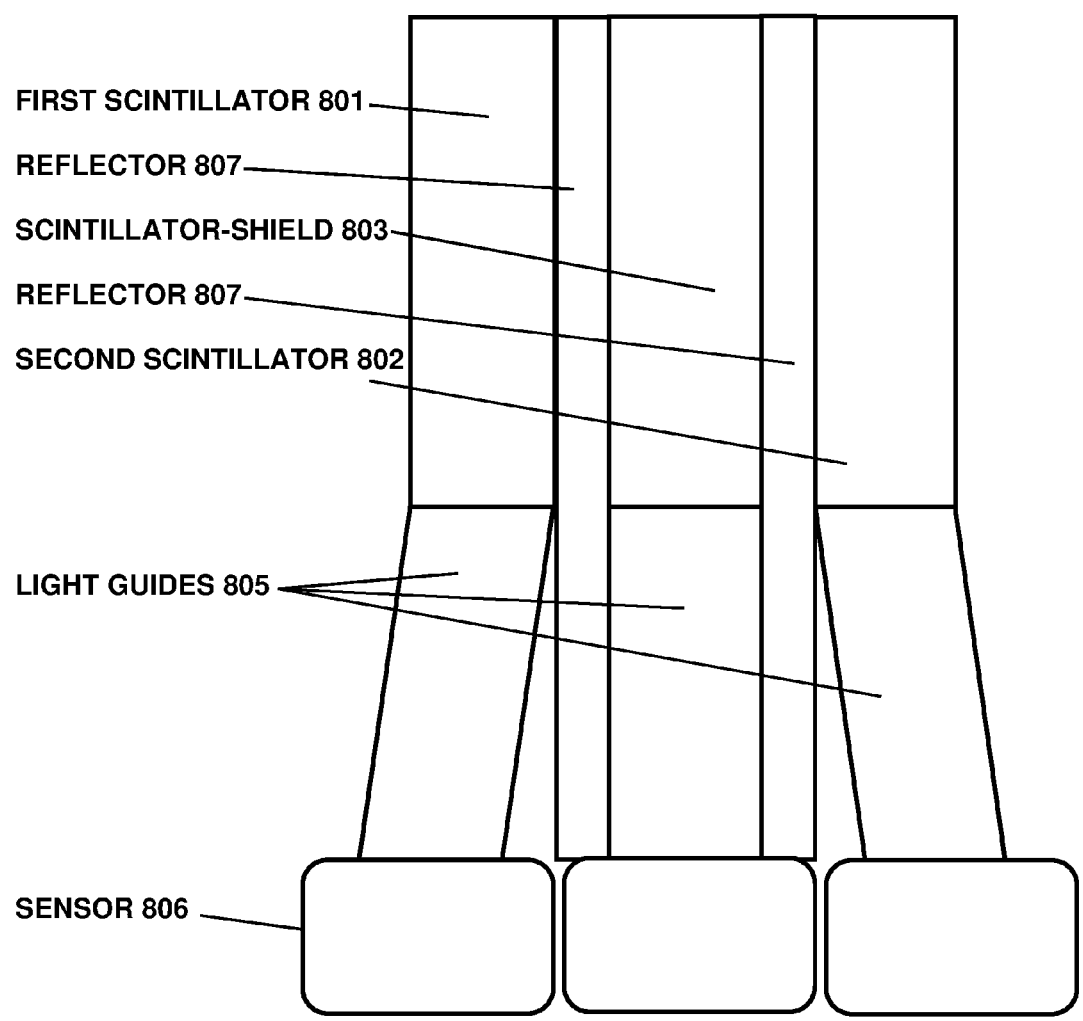
FIG. 8 is a sketch in cross-section of a detector according to the invention comprising a shield comprising a third scintillator, two reflective layers adjacent to two further scintillators, with three light guides leading to three sensors. This is an example of light-path discrimination with a scintillator-shield.

FIG. 8 is a cross-section sketch of the inventive detector with light-path-discrimination, and again a scintillator for the shield. Here the central scintillator-shield 803 is coated on both sides by opaque reflectors 807 such as aluminum foil. Adjacent to the scintillator-shield 803 are a first scintillator 801 and a second scintillator 802. All three scintillators are coupled to three separate light guides 805 which convey the light to three sensors 806. An advantage of the configuration of FIG. 8 is that the first scintillator 801 and the second scintillator 802 could be the same type. In fact all three scintillators could be the same type since they feed separate sensors 806, thereby simplifying construction and analysis.

Figure 9:
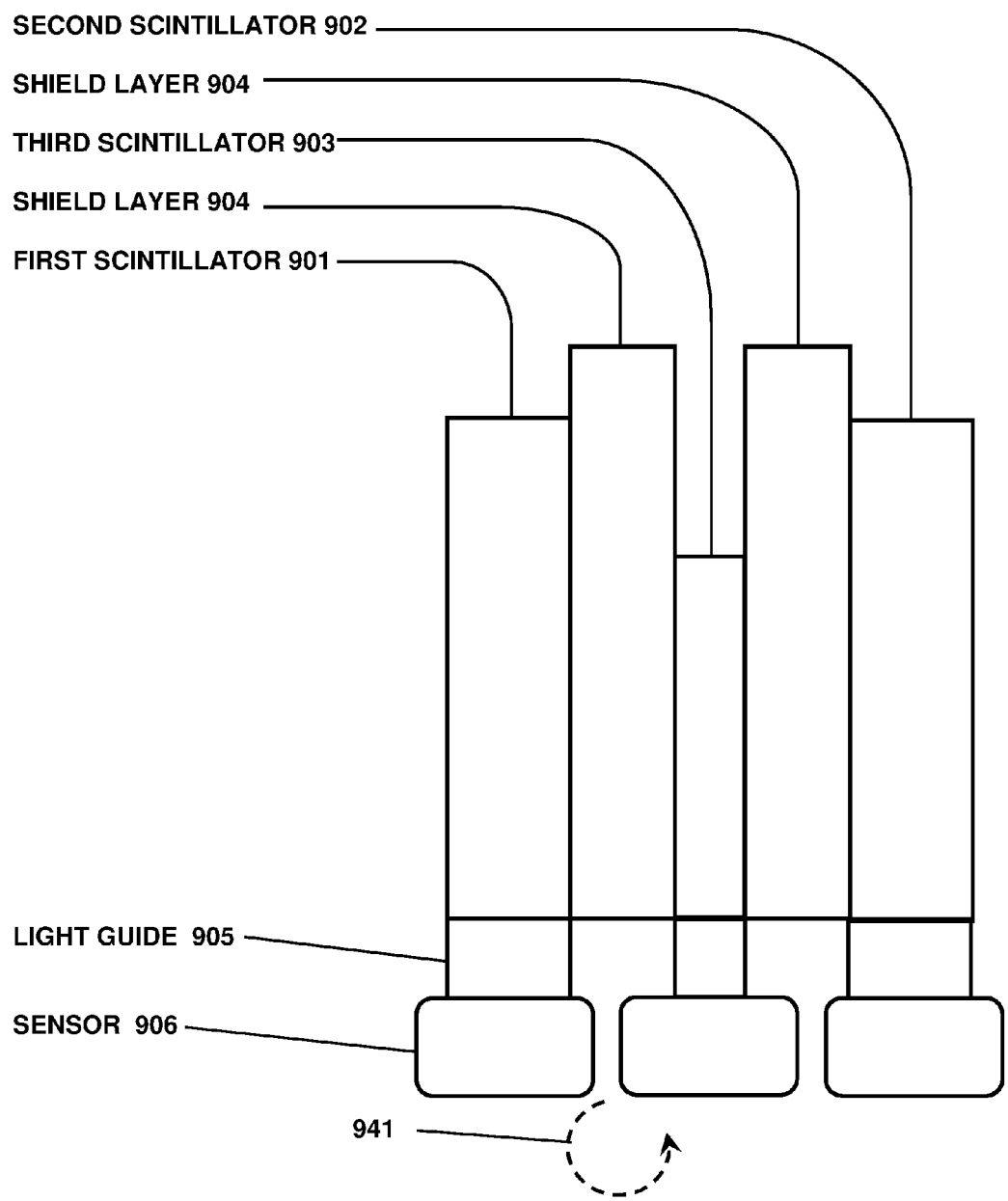
FIG. 9 is a cross-section sketch of the inventive detector in which the shield comprises two separated shield layers, with a third scintillator between them. The detector is pointing up.

FIG. 9 is a cross-section sketch of the inventive detector in which the shield comprises two spaced-apart shield layers 904, with a third scintillator 903 between. A first scintillator 901 is on one side and a second scintillator 902 is on the opposite side as usual. The first and second scintillators 901 and 902 indicate the source location as described with the other versions, unaffected by whether the shield 904 is monolithic or split. At the same time, the third scintillator 903 may provide energy spectrometry or other functions.

Each scintillator 901, 902, and 903 is coupled to a separate sensor 906 by a separate light guide 905. The configuration is thus an example of light-path discrimination. No reflectors are needed because the shield layers 904 are opaque in this case. In operation, the detector is to be rotated as indicated by the dashed arrow 941, thereby exposing the first scintillator 901 or the second scintillator 902 to a radiation source (not shown) according to the detector angle.

Figure 10:
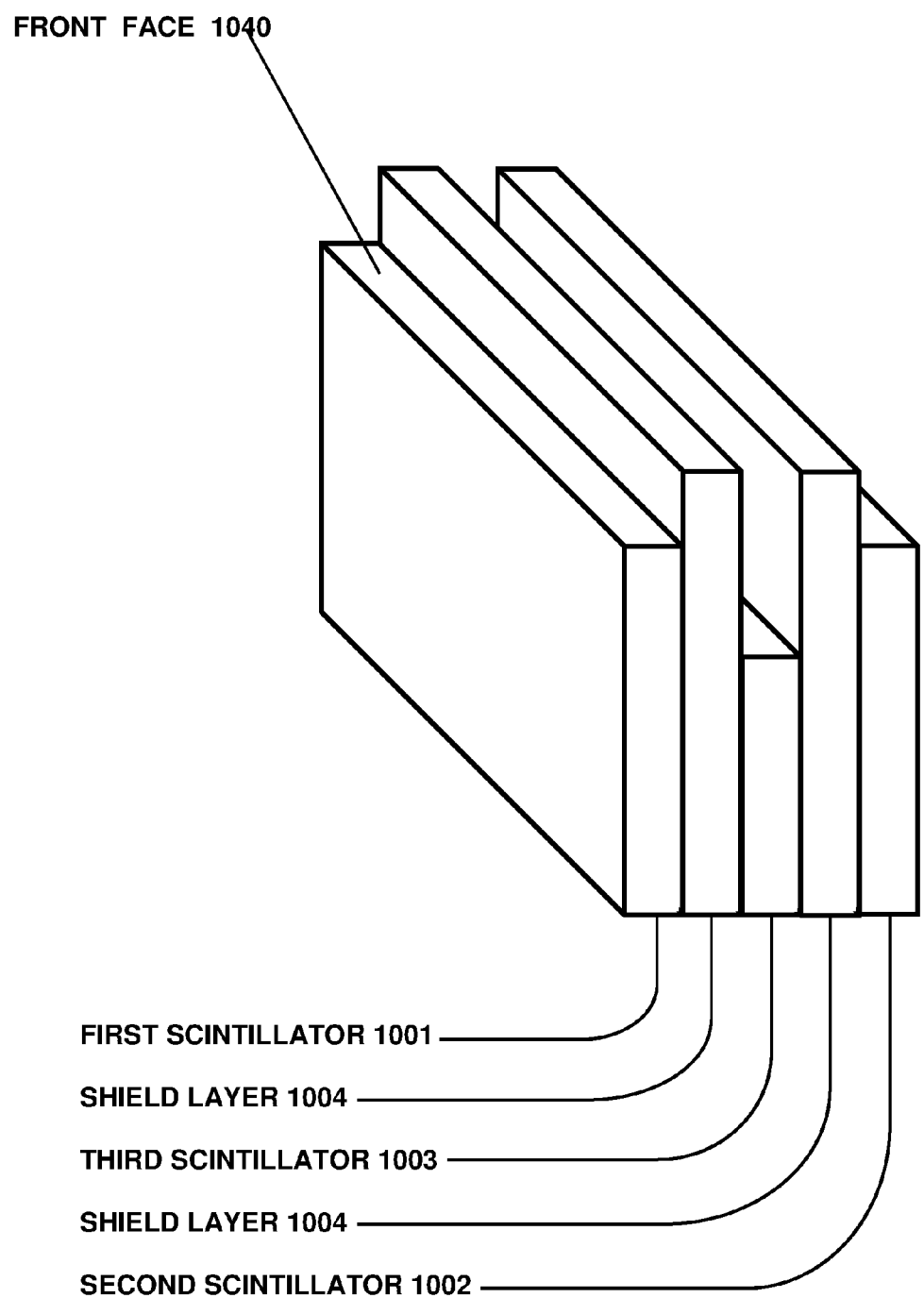
FIG. 10 is a sketch in perspective of the detector of FIG. 9 with two shield layers and three scintillators, again pointing up.

FIG. 10 is a sketch in perspective of the detector of FIG. 9, again pointing up. The front face 1040 is at the top surface of the first and second scintillators 1001 and 1002. The two shield layers 1004 protrude beyond the front face 1040, while the third scintillator 1003 is recessed deeper between the shield layers 1004. The protrusion of the shield layers 1004 provides extra sharpness in the angular response of the outside scintillators 1001 and 1002, while the recessed position of the third scintillator results in narrower peaks and better angular resolution of that scintillator.

Figure 11:
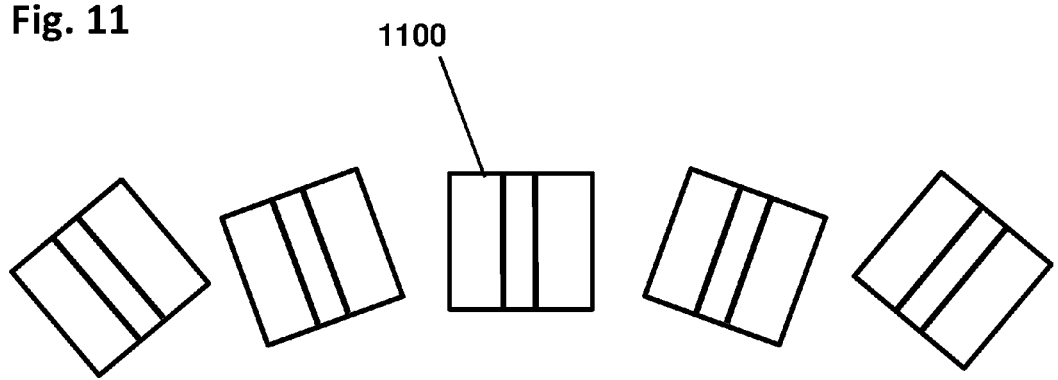
FIG. 11 is a top-view sketch of a horizontal array of the inventive detectors, all pointed in different directions, so that a range of angular data can be acquired simultaneously without rotating the detector.

FIG. 11 shows a top view of an array of the inventive detectors 1100. Each detector is at a different location and is aimed at a different angle. The various detector angles may comprise an angularly spaced-apart series, or any other sequence of angles. Analyzing the signals from each detector 1100 reveals the azimuth of a radiation source, so long as the source is within the angular range of the detectors 1100. An advantage of such an array is that there is no need to rotate any detector 1100. Another advantage is that the source position is obtained very rapidly, as soon as each detector 1100 has accumulated enough counts to compare the two scintillator rates of each detector. The array is spread out laterally, in the same direction as the angles are varied, hence the array may be termed a "fan" array as it resembles a fan. One issue, however, is that each detector 1100 could shadow its neighboring detector. To prevent such neighbor shadowing, the detectors 1100 are well-separated laterally, with a gap between successive detectors 1100 as shown. Advantageously, this spatial spreading may provide information on the distance to the source as well as its azimuth angle.

Figure 12:
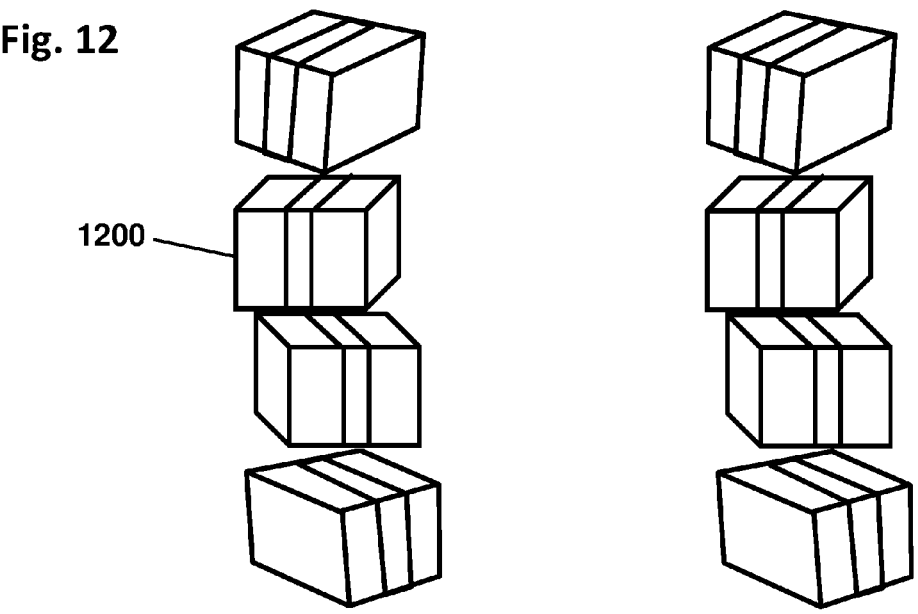
FIG. 12 is a front-view perspective sketch of a detector array comprising two spaced-apart columns of directional detectors, all pointed in different directions, so that a range of angular data can be acquired simultaneously without rotating the detectors, and without blocking adjacent detectors. The source distance can also be obtained from the data.

FIG. 12 shows an alternative array of the inventive detectors 1200, this time with two columns stacked vertically, and shown in a front-view perspective drawing. Each detector 1200 is aimed in a different direction, but now they are stacked vertically, yet still angle-scanned horizontally. The array may be termed a "barber pole" configuration due to the helical symmetry. An advantage of the vertical stacking is that neighbor shadowing is largely eliminated, without the need to leave space between the detectors 1200. This is because the detector orientations are scanned horizontally while the detector spacing is vertical. The barber-pole configuration is typically more compact than the fan configuration. Two such vertical arrays, as shown, would be sufficient to localize the source in both direction and distance.

Figure 13:
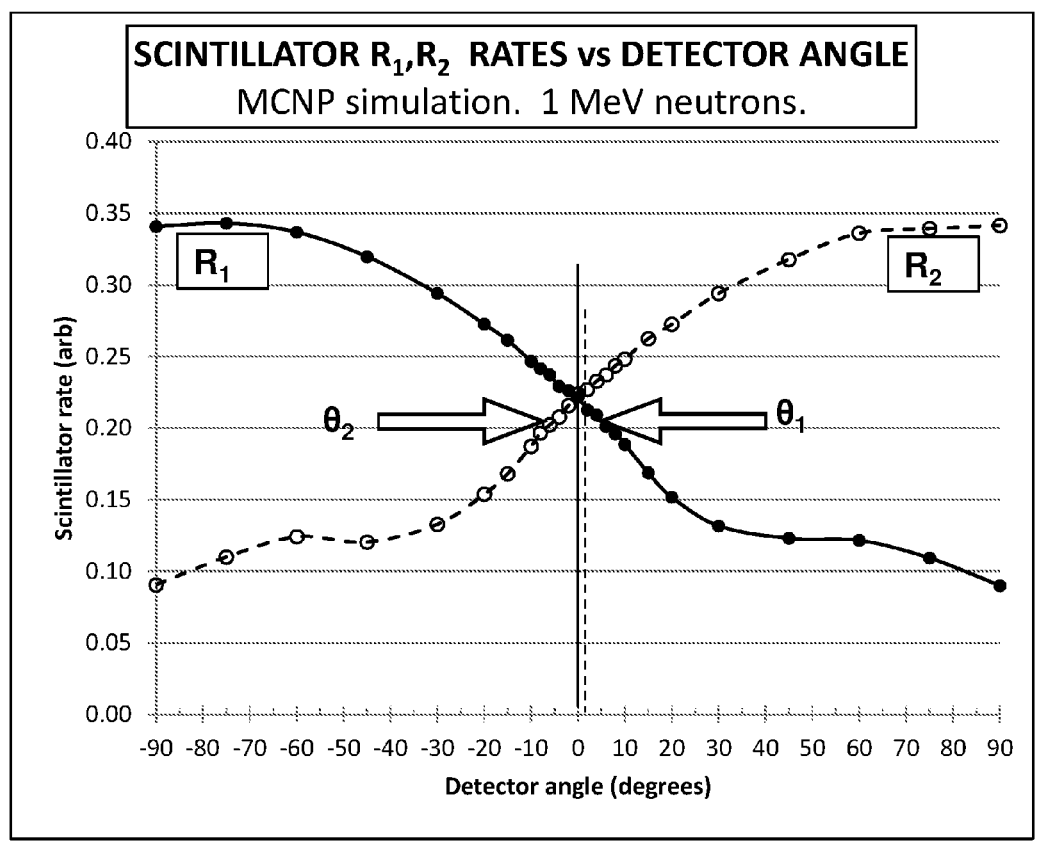
FIG. 13 is a graph showing results of an MCNP simulation of energetic neutron detection using the detector of FIG. 5. The two scintillator counting rates versus detector angle are plotted. Also the inventive analysis methods "equal-rates" and "half-max" methods are demonstrated.

FIG. 13 is a graph showing results of a MCNP simulation. Here 1 MeV neutrons were incident on a detector such as that of FIG. 5. Light-path discrimination was assumed. The two scintillators were identical plastic PVT scintillators 4 cm thick, while the shield was HDPE at 2 cm thickness. The lateral dimensions of the scintillator were 8×8 $cm^2$. The shield protruded beyond the scintillators by 4 cm. The graph shows the counting rates $R_1$ (solid curve) and $R_2$ (dashed curve) of the two scintillators in arbitrary units, versus the detector angle which is the horizontal axis. The neutron source was at zero degrees. As expected, each scintillator exhibited a high detection rate when facing the source and a low counting rate when turned away.

The graph also illustrates the inventive "equal-rates" analysis method, in which the source azimuth is an angle at which the two scintillators show equal counting rates. Inspection of the raw data indicates that the source angle, using the equal-rates method, is at about 0.1 degrees, which is surprisingly close to the actual source angle of zero degrees. A solid vertical line indicates the azimuth obtained using the equal-rates method.

The figure also illustrates the second analysis method, the "half-max" method. An angle $\theta_1$ is obtained by finding the maximum counting rate of $R_1$ (at −90 degrees in this case) and the minimum $R_1$ counting rate (at +90 degrees), and averaging those two rates; then the detector angle $\theta_1$ is a particular angle at which the first scintillator counting rate is equal to that average. Thus $\theta_1$ is termed the half-max angle for the first scintillator. Likewise an angle $\theta_2$ is found where $R_2$ is half-way between the maximum and minimum counting rates for the second scintillator. The two half-max angles are indicated by fat arrows in the figure. The source angle is then the average of the two half-max angles, $\theta_S=(\theta_1+\theta_2)/2$. In this case that turns out to be 0.25 degrees which is indicated by the vertical dashed line in the figure.

Unlike prior-art collimators, the inventive shields are completely unobstructing when the detector is aimed at the source, hence high counting rates and high efficiencies are obtained. This is in direct contrast to prior-art collimated systems in which the majority of the incident particles are absorbed in the collimator regardless of orientation.

Figure 14:
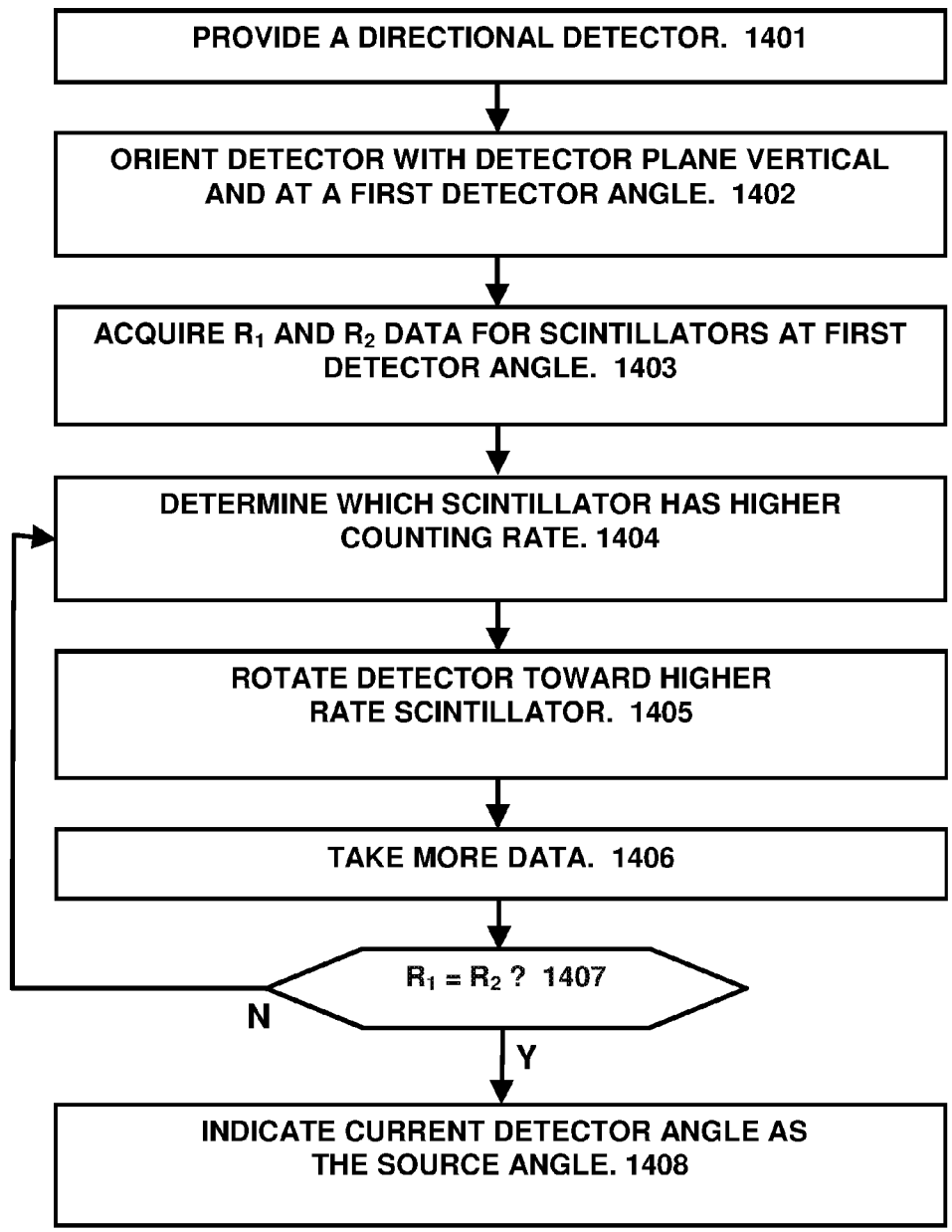
FIG. 14 is a flowchart showing steps for analyzing the scintillator signals according to the inventive "equal-rates" method as demonstrated in FIG. 13.

FIG. 14 is a flowchart showing the steps of the "equal-rates" method of angular analysis which was used in FIG. 13. First (1401) a directional detector is provided, comprising any of the detector versions disclosed herein, and with the shield and scintillator materials selected according to the particle type. The detector is oriented (1402) with its detector plane vertical (assuming the azimuth of the source is to be measured; horizontal if the elevation angle is to be found). Then the scintillator counting rates are acquired (1403) at whatever angle the detector is initially positioned at. Usually the detector is started at the center of its angular field of view unless there is some reason to suspect a different source location. For the simulation of FIG. 13, the starting angle was selected as −90 degrees to make sure the solution was not too easy.

The counting rate data indicates (1404) which side of the detector the source is likely to be located. The detector is rotated (1405) toward the source direction by an angle, which in this case was only 15 degrees, but in practice could be much larger. Then additional rate data are acquired (1406). If the rates are not yet substantially equal (1407) the last 3 steps are repeated. Then the source angle is derived (1408), being that particular angle where the rates are substantially equal. The chart of FIG. 13 shows many more data points than necessary to localize the source, for graphical clarity.

The method involves iteratively adjusting the detector angle according to each previous measurement of the detection rates, always rotating toward the higher-counting scintillator until they are both equal. An efficient way to do the iteration is to start out centered in the field of view (that is, start at zero degrees in a field of ±90 degrees), and initially use a large step size angle representing one-quarter of the field of view, which in this case would be 45 degrees. Then the angular step size is reduced by half on each subsequent rate measurement. For the example of a 180-degree inspection field, the detector would start centered at zero degrees, acquire the first data, then rotate in the indicated direction by 45 degrees, acquire again and rotate by 22.5 degrees, followed by 11.25 degrees, and so forth. The angular step size is decreased by half each time until the source is found.

Figure 15:
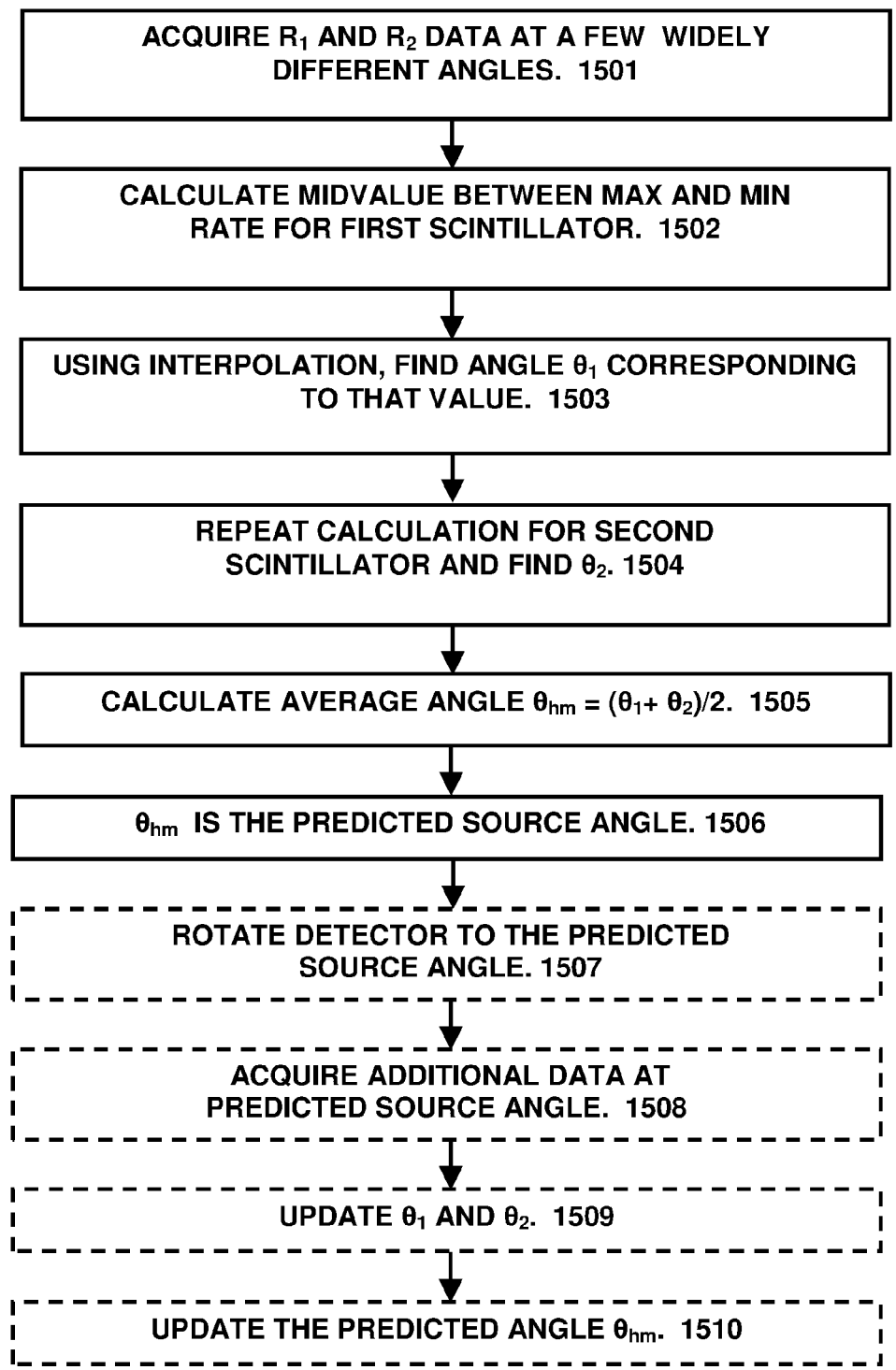
FIG. 15 is a flowchart showing steps for analyzing the scintillator signals according to the inventive "half-max" method as demonstrated in FIG. 13.

FIG. 15 is a flowchart showing the steps of the "half-max" method of angular analysis. First (1501) acquire data on the two scintillator rates at several widely different angles such as ±90 degrees and ±30 degrees, that is, in 60-degree steps across the field of view. Then (1502) calculate the midvalue by averaging the max and min values for each scintillator. Using interpolation (1503) calculate an angle $\theta_1$ where the first scintillator is expected to count at its midvalue rate. Repeat (1504) for the second scintillator, deriving $\theta_2$. Then (1505) average $\theta_1$ and $\theta_2$ to obtain a predicted source angle (1506). Optionally, to fine-tune the result, the detector can be rotated (1507) to the predicted source angle, additional data are then acquired there (1508), and the half-max angles are again recalculated using the updated values (1509). Then the final source angle can be updated accordingly (1510).

Figure 16:
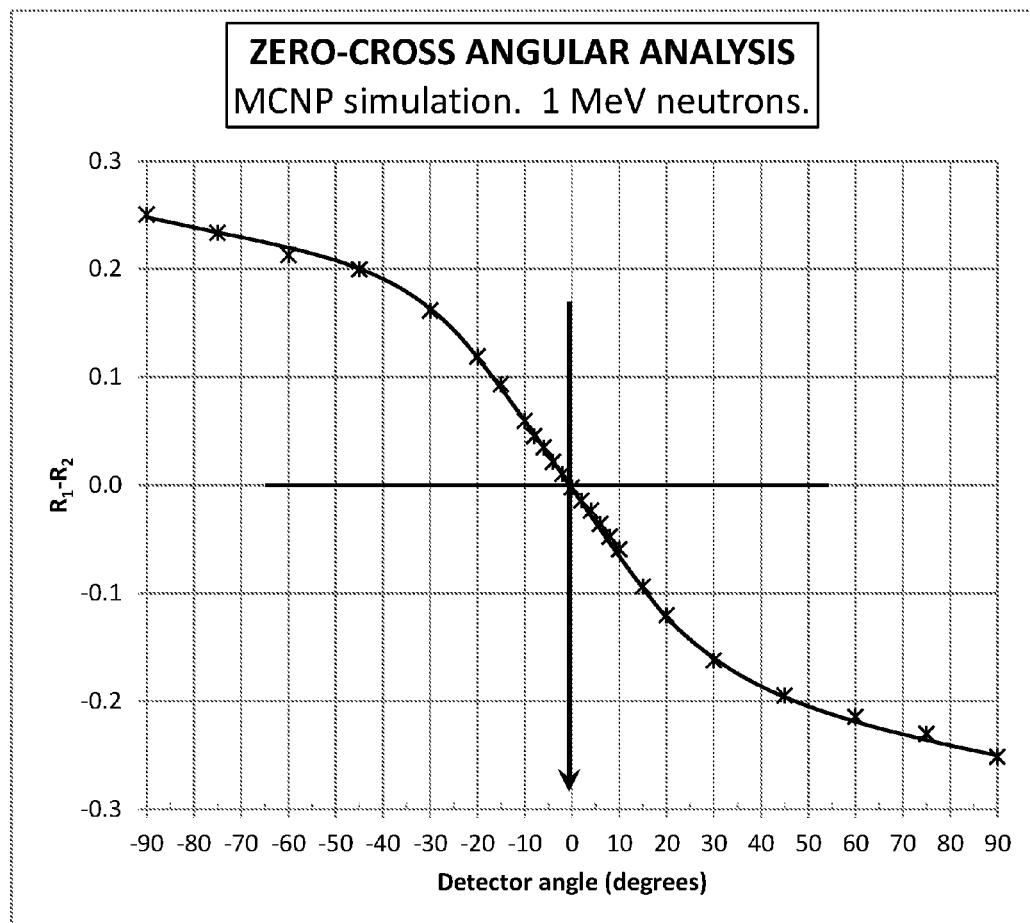
FIG. 16 is a graph demonstrating the "zero-cross" analysis method using MCNP simulation results with 1 MeV neutrons.

FIG. 16 is a chart showing the "zero-cross" angular analysis method using the same fast-neutron data and detector model as discussed with reference to FIG. 13. Here the difference between the two scintillator counting rates, $R_1-R_2$, is shown versus detector angle. As the detector is rotated to different angles, the $R_1-R_2$ function goes from positive values (mainly due to the first scintillator) to negative values (mainly the second scintillator). A sigmoidal curve is fit to all the data and is also plotted. The zero-cross point is that angle where the fit curve passes through zero, and is indicated by a vertical arrow. In this case, that is about −0.5 degrees.

Figure 17:
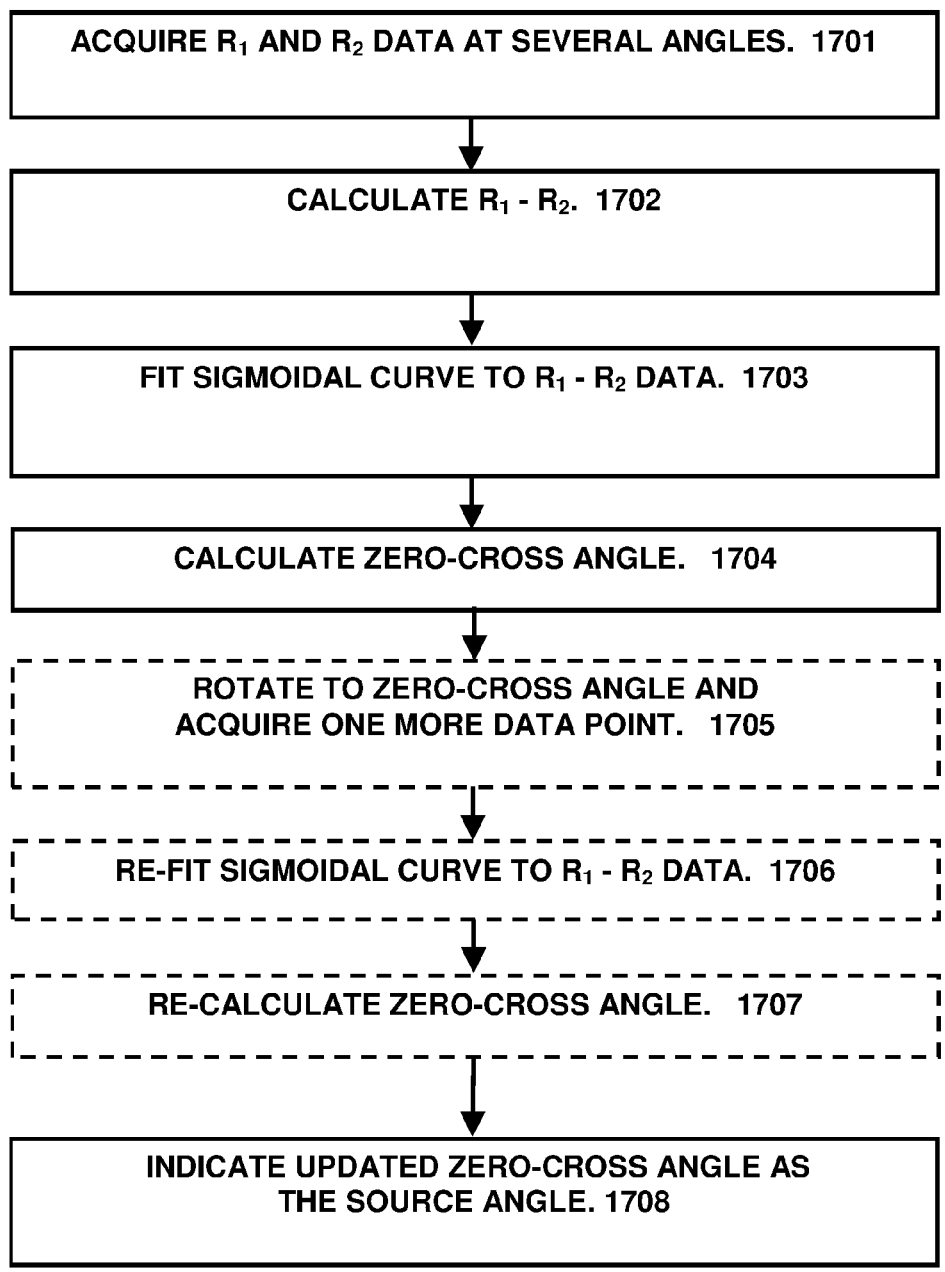
FIG. 17 is a flowchart showing steps for analyzing the scintillator signals according to the inventive "zero-cross" method as demonstrated in FIG. 16.

FIG. 17 is a flowchart showing the steps of a method according to the "zero-cross" analysis method. First (1701) acquire scintillator rate data at a few widely separated values such as ±90 degrees and ±30 degrees. Then (1702) calculate the difference $R_1-R_2$ at each angle. Fit a sigmoidal curve (1703) to the data, and calculate where the curve passes through zero (1704). Optionally, rotate the detector to that predicted angle (1705) and acquire an additional measurement of the rates, and again fit the curve (1706), and re-calculate the final zero-cross angle (1707) and report it (1708).

The optimal fitting parameters of the $R_1-R_2$ curve are somewhat dependent on the detector design. A generic curve shape such as $f(x)=A \tan h(\theta-B)+C\theta+D$ can be used with usually good results, however artisans may wish to adapt the fitting function to their particular system, using calibration data for example.

Figure 18:
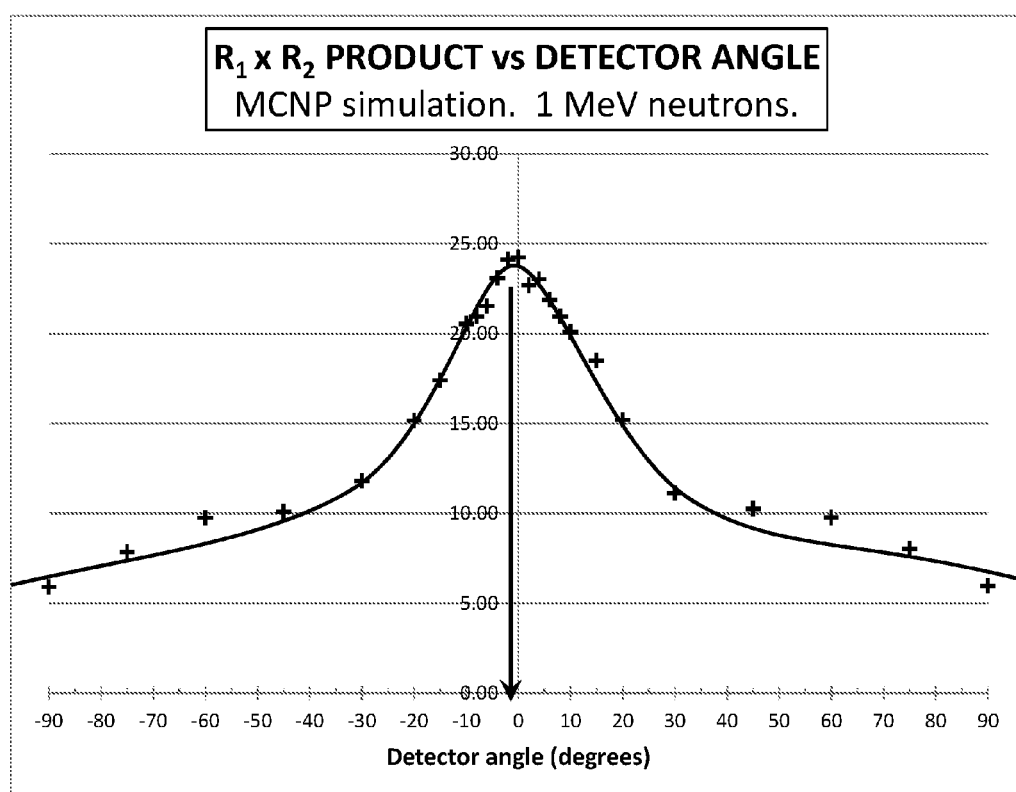
FIG. 18 is a graph demonstrating the "peak-detect" analysis method using MCNP simulation results with 1 MeV neutrons.

FIG. 18 is a chart showing the results of the "peak-detect" analysis method, again using the same MCNP simulation as FIG. 13. Here the product of the two counting rates, $R_1 \times R_2$ is plotted, although artisans may select a different function according to their particular detector configuration. The data exhibit a pronounced peak at the source angle since, at all other angles, one of the scintillators is at least partially obscured. The peak centroid is indicated by an arrow which is the predicted source location, here about −1.0 degrees.

Figure 19:
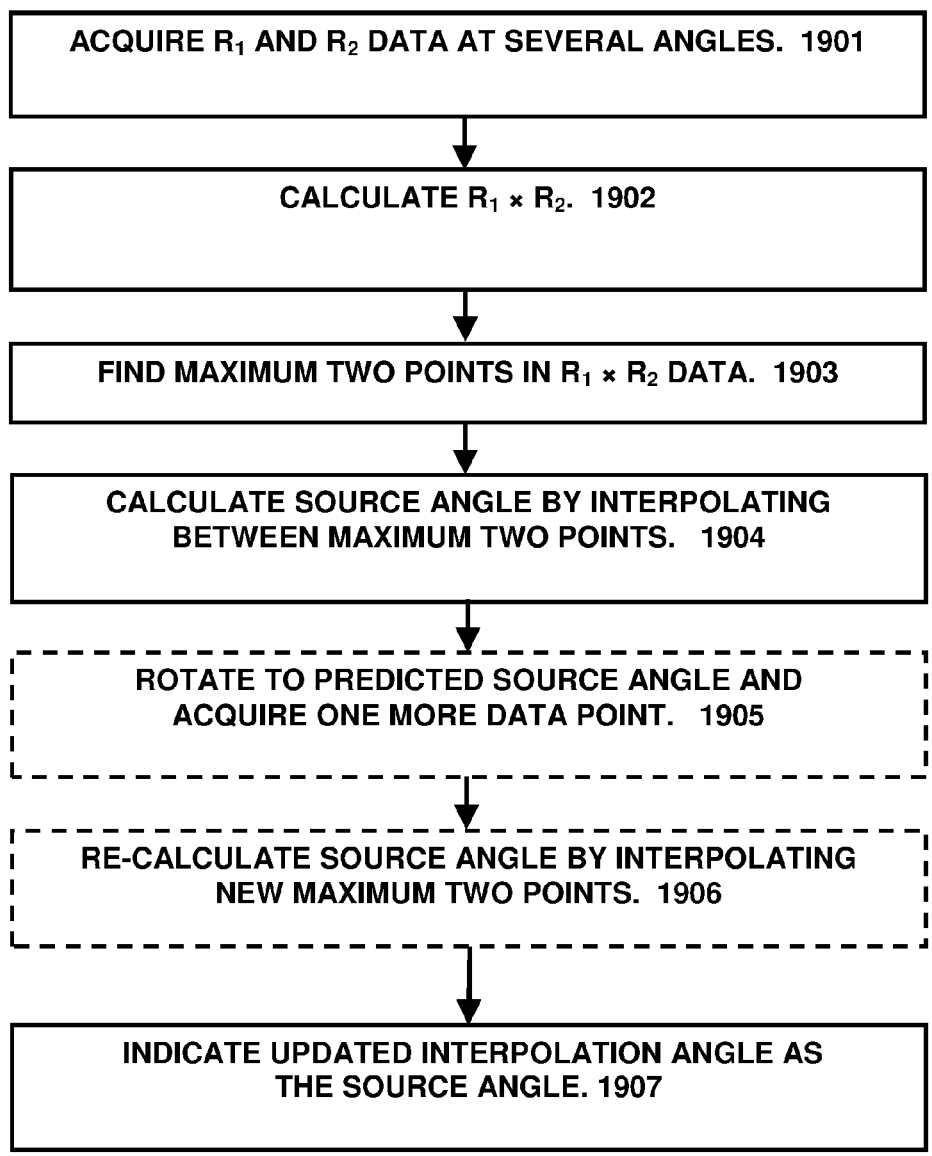
FIG. 19 is a flowchart showing steps for analyzing the scintillator signals according to the inventive "peak-detect" method as demonstrated in FIG. 18.

FIG. 19 is a flowchart showing the steps of the peak-detect method. First (1901) acquire scintillator rate data at a few widely separated values such as ±90 degrees and ±30 degrees. Then (1902) calculate the peaking function, which here is $R_1 \times R_2$. Select the highest two points in the data (1903). Usually these two points are adjacent. Interpolate between the two highest points (1904) to determine a predicted source azimuth. Optionally, rotate to that predicted angle (1905) and acquire further data there, then re-interpolate using the new maximum points (1906). Then (1907) indicate the final angle as the source direction.

Usually, if a source is actually present, the maximum two points are adjacent angular measurements. If they are not adjacent, it is likely that (a) there is no source and the scintillators are just counting background, or (b) the source is at an extreme angle such as 90 degrees, or (c) multiple sources are present. In that case, return to step 1901 and acquire data at the intermediate angles, such as ±60 and zero degrees, then again try to interpolate between the highest two points.

Figure 23:
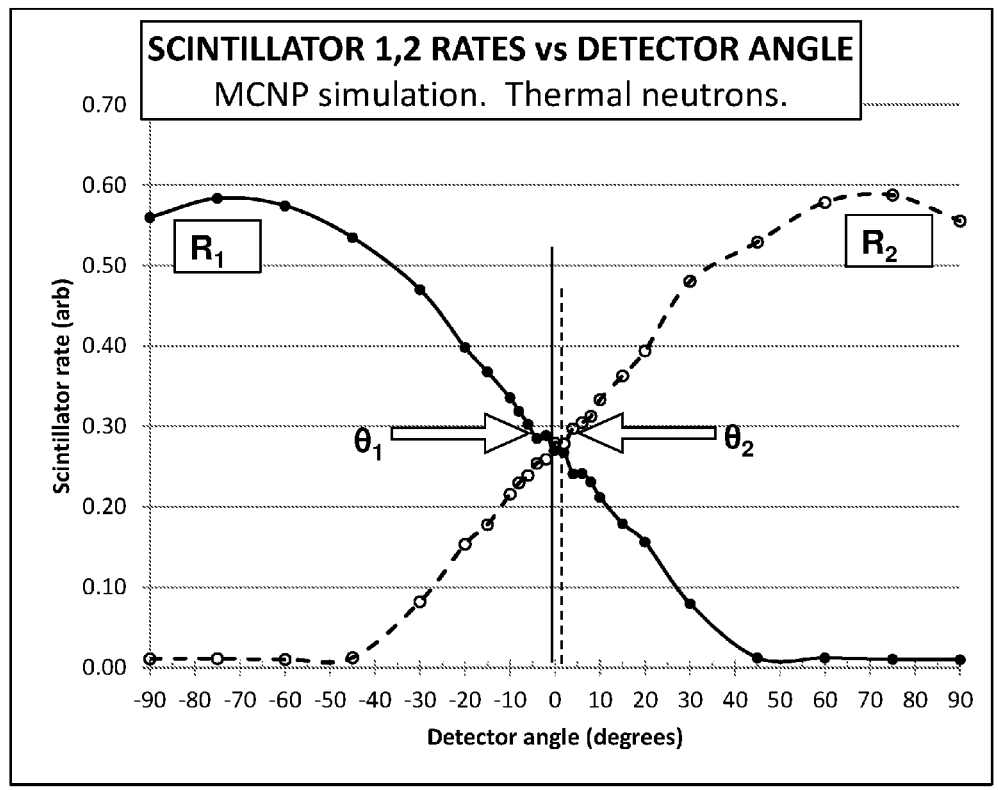
FIG. 23 is a chart showing MCNP results for thermal neutron detection, demonstrating the "equal-rates" and "half-max" analysis methods with thermal neutrons.
Figure 24:
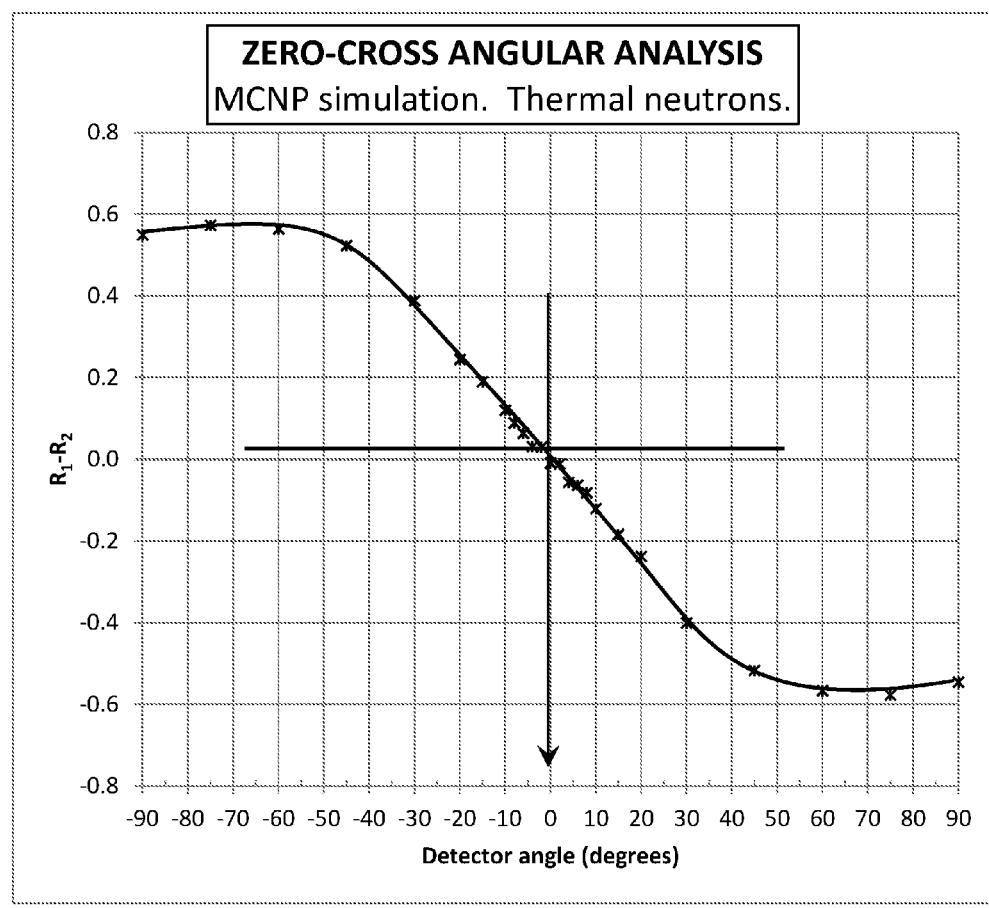
FIG. 24 is a chart showing MCNP results for thermal neutron detection, demonstrating the "zero-cross" analysis methods with thermal neutrons.
Figure 25:
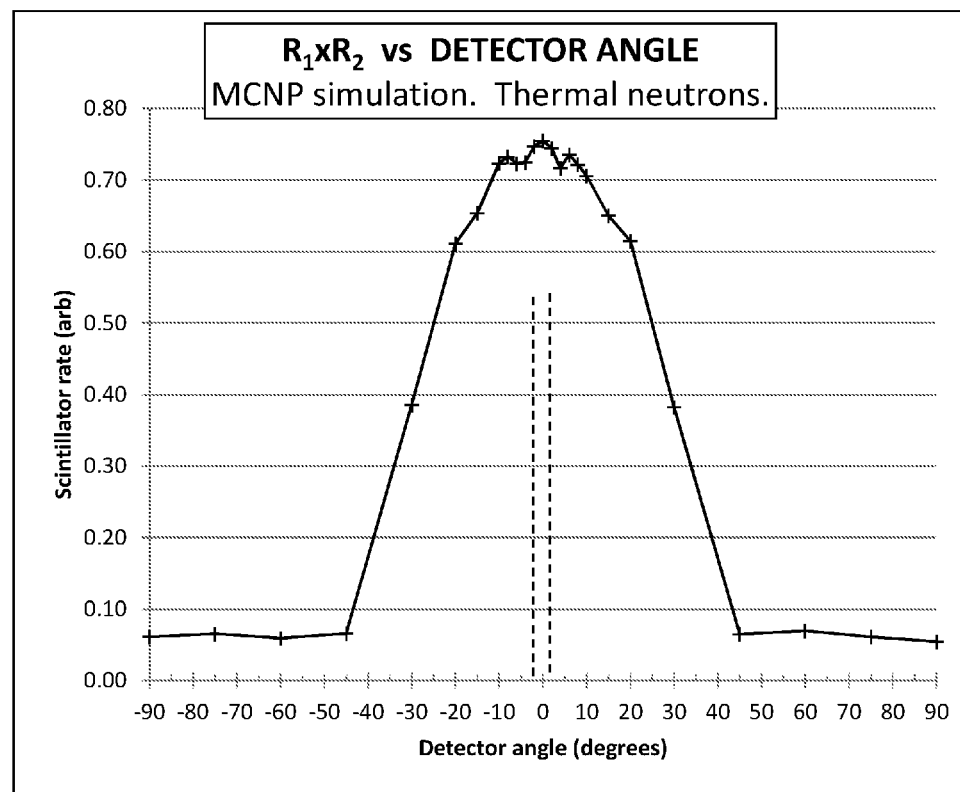
FIG. 25 is a chart showing MCNP results for thermal neutron detection, demonstrating the "peak-detect" analysis methods with thermal neutrons.

As mentioned, the inventive detector and analysis methods apply equally well to many kinds of particles. The foregoing few charts dealt with a fast-neutron simulation. For comparison, the following FIGS. 20-22 show the results of an MCNP simulation using 1 MeV gamma rays, and FIGS. 23-25 show the results of a thermal neutron simulation.

The detector for the gamma data is of the type shown in FIG. 9, with the shield split into two layers and a third scintillator between. The two outer scintillators are 2.5 cm thick PVT-based plastic and the third scintillator is 3 cm of NaI. The shield layers are 1.5 cm thick lead, with a 2.5 cm protrusion distance. The chart shows the two scintillator counting rates which are equal at a detector angle of −0.2 degrees, as indicated by a solid vertical line. The same data was analyzed using the half-max procedure, with the half-max angles indicated by fat arrows. The source direction as determined by the half-max analysis is +0.5 degrees, indicated by a dashed vertical line.

Figure 20:
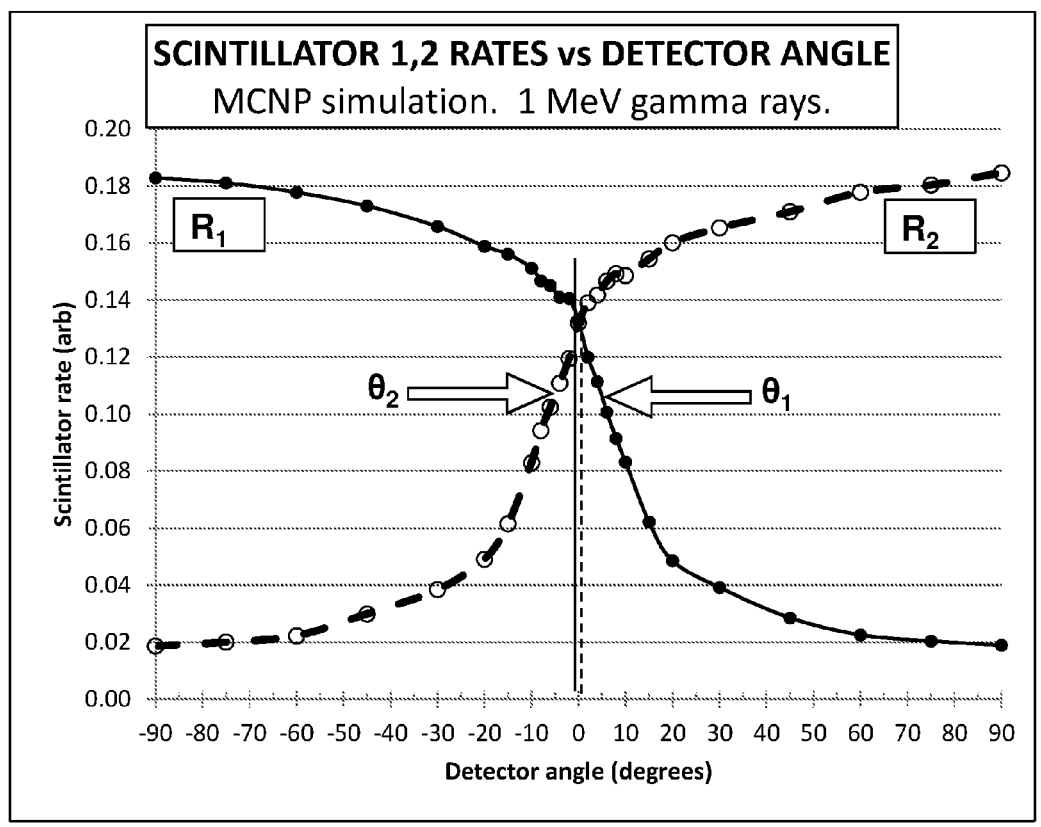
FIG. 20 is a chart showing MCNP results for gamma ray detection, demonstrating the "equal-rates" and "half-max" analysis methods with gamma rays.
Figure 21:
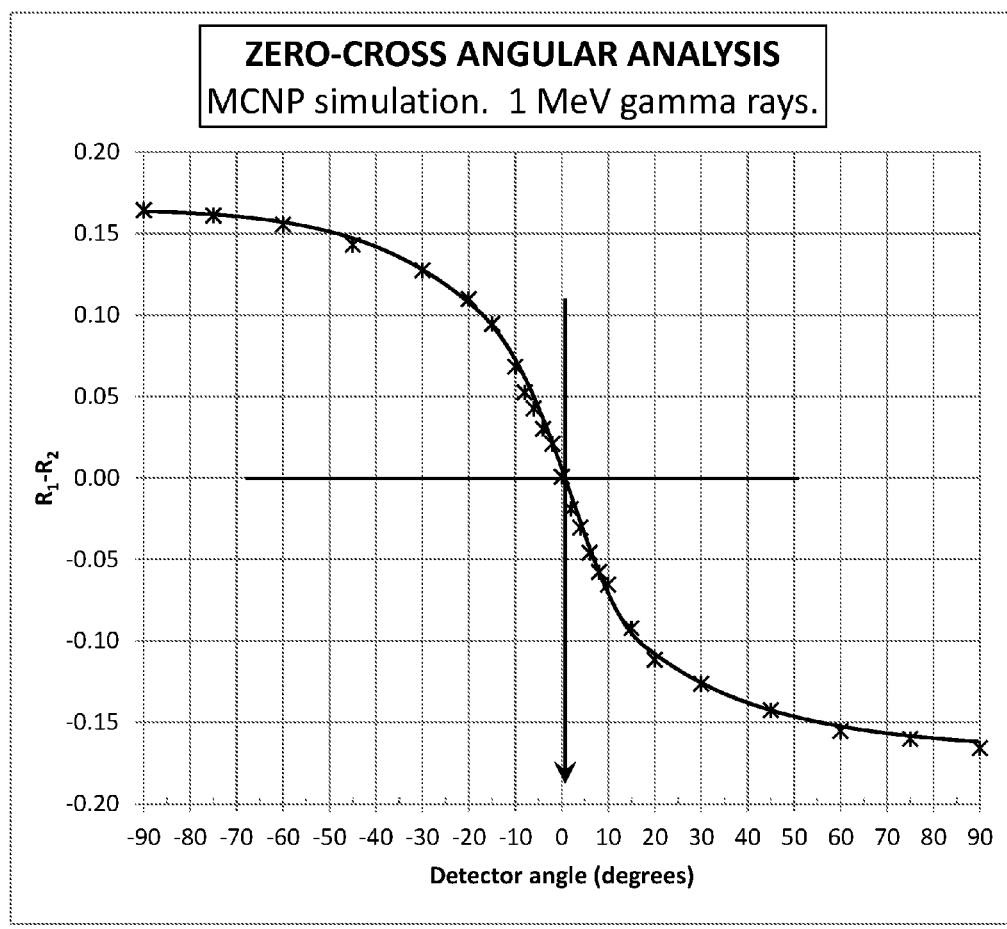
FIG. 21 is a chart showing MCNP results for gamma ray detection, demonstrating the "zero-cross" analysis methods with gamma rays.

FIG. 21 shows the same 1 MeV gamma ray data as FIG. 20 but analyzed using the zero-cross method. The source direction, as determined by the fit curve, is +0.2 degrees.

Figure 22:
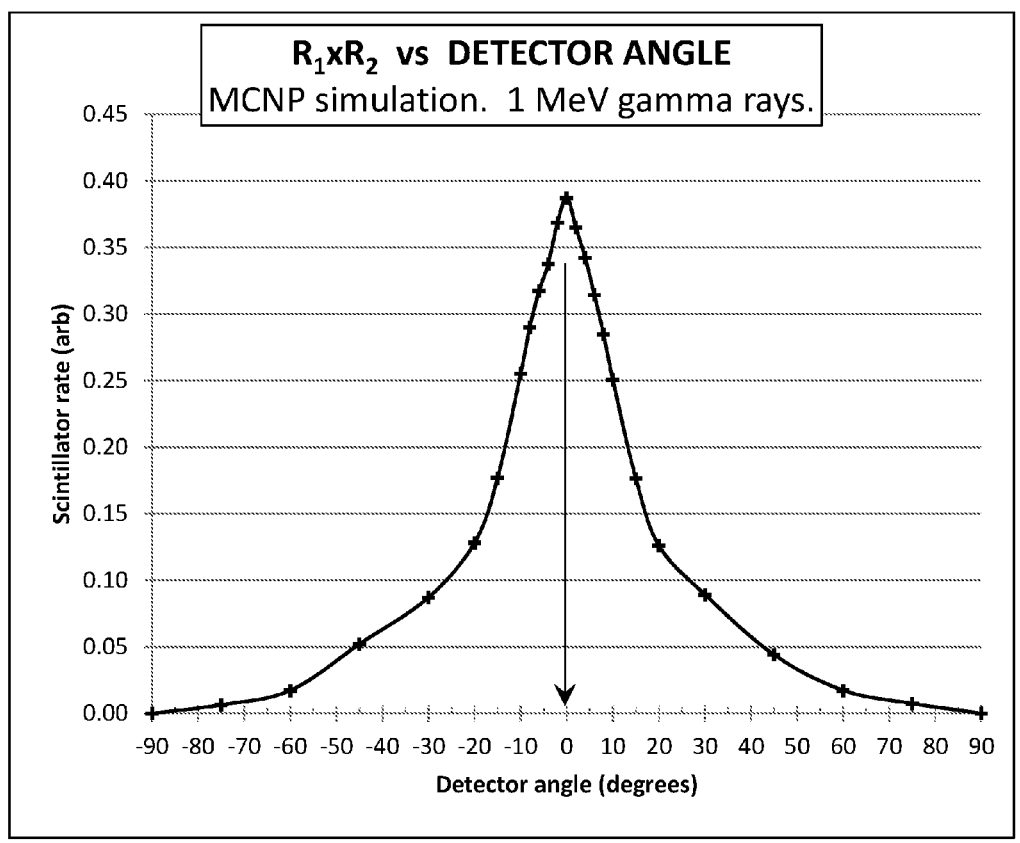
FIG. 22 is a chart showing MCNP results for gamma ray detection, demonstrating the "peak-detect" analysis methods with gamma rays.

FIG. 22 shows the same data as FIG. 20 but analyzed using the peak-detect method, with the function $R_1 \times R_2$. The source azimuth is indicated as −0.1 degrees. Thus all four methods agree to better than 1 degree using 1 MeV gamma rays as the particle.

FIG. 23 is a chart showing a similar MCNP study using thermal (0.025 eV) neutrons, and using a detector such as that of FIG. 5 with a single monolithic separator. For this simulation, the scintillators are 4 cm thick PVT with 5% boron-10, and the shield is 2 cm HDPE with 5% boron-10 and with a 4 cm protrusion distance. The equal-rates method as shown in FIG. 23 indicates that the source is at −0.2 degrees, while the half-max method indicates +0.75 degrees.

FIG. 24 shows the zero-cross analysis of the data of FIG. 23. The indicated source direction is about −0.25 degrees based on the sigmoid fit curve crossing zero.

FIG. 25 shows the same data analyzed using the peak-detect product. However, the resulting peak is extremely wide in this case. The peak shape is due to the very low penetration of thermal neutrons in borated plastic. From the symmetry of the response, the source direction can only be determined within ±2 degrees, as indicated by dashed vertical lines. Therefore the peak-detect method clearly detects and localizes the source, but due to the poor angular resolution the peak-detect method is less preferred than the other three methods, for thermal neutrons. However, the other three methods agree with each other, and with the correct source azimuth, to less than 1 degree.

The inventive detector offers numerous advantages not previously available. In applications ranging from cargo inspection, to walk-through portals, to portable survey meters, to mobile scanners searching for unexpected radiation in an urban environment, and many other critical applications, the inventive detector is enabling. The detector detects gamma rays or neutrons efficiently, and indicates whether the source is to the left or right side, and with further data also localizes the source direction precisely. Unlike prior-art collimated detectors, the inventive shield does not reduce the detection efficiency since at least one scintillator is fully exposed to the source no matter how the detector is rotated. The shield only prevents particles from passing all the way through the detector; it does not prevent particles from reaching the first scintillator. The new detector thus provides very high detection efficiencies and very rapid source localization. Furthermore, the inventive detector is compact, low-cost, self-contained, rugged, and reliable.

Advanced radiation detection systems like that disclosed herein, will be needed in the coming decades to protect innocent people from the threat of nuclear and radiological terrorism.

The embodiments and examples provided herein illustrate the principles of the invention and its practical application, thereby enabling one of ordinary skill in the art to best utilize the invention. Many other variations and modifications and other uses will become apparent to those skilled in the art, without departing from the scope of the invention, which is to be defined by the appended claims.

What is claimed is:
1. A device comprising:
a shield comprising a substantially planar body of material that blocks or attenuates a particle from a radioactive source;
a first scintillator comprising a substantially planar body of material that emits a first light pulse responsive to an interaction by the particle in the first scintillator;
a second scintillator comprising a substantially planar body of material that emits a second light pulse responsive to an interaction by the particle in the second scintillator;
one or more light sensors that produce an electrical signal responsive to a light pulse; and
a processor comprising an automatic electronic calculation or logic device capable of performing arithmetic calculations according to a preprogrammed method;
wherein:
the first scintillator, the second scintillator, and the shield are all substantially parallel to each other;
the first scintillator is substantially in contact with a first surface of the shield, and the second scintillator is substantially in contact with a second surface of the shield, the second surface being opposite to the first surface;
the light sensors are configured to produce a first electrical signal associated with the first scintillator, and to produce a second electrical signal, distinct from the first electrical signal, associated with the second scintillator;
the processor is configured to determine a direction related to the particle;
the shield comprises two spaced-apart layers;
a third scintillator is positioned between the layers;
the third scintillator comprises material that emits a third light pulse responsive to an interaction by the particle in the third scintillator;
the light sensors are configured to produce a third electrical signal, distinct from the first and second electrical signals, responsive to the third light pulse;
the device has a front face comprising a plane orthogonal to the shield;
the first and second scintillators are bounded by the front face; and the third scintillator is substantially recessed relative to the front face.

2. The device of claim 1, wherein:
the device has a front face comprising a plane orthogonal to the shield;
the first and second scintillators are bounded by the front face;
the shield protrudes beyond the front face by a protrusion distance;
the shield protrusion is configured to prevent the particle from passing therethrough; and
the protrusion distance is related to a thickness of the first or second scintillator.

3. The device of claim 1, wherein the processor is configured to perform a method comprising:
calculating a first counting rate associated with the first scintillator and a second counting rate associated with the second scintillator;
comparing the first counting rate with the second counting rate;
indicating a first direction when the first counting rate is greater than the second counting rate;
indicating a second direction, opposite to the first direction, when the second counting rate is greater than the first counting rate;
indicating a third direction, parallel to the detector plane, when the first and second counting rates are substantially equal; and
illuminating an optical beam, directed parallel to the detector plane, when the first and second counting rates are substantially equal.

4. The device of claim 1, which further includes three separate indicators comprising a first indicator, a second indicator, and a third indicator, and wherein the processor is configured to perform a method comprising:
calculating a first counting rate associated with the first scintillator and a second counting rate associated with the second scintillator;
activating the first indicator and deactivating the second and third indicators when the first counting rate is greater than the second counting rate;
activating the second indicator and deactivating the first and third indicators when the second counting rate is greater than the first counting rate; and
activating the third indicator and deactivating the first and second indicators when the first counting rate is substantially equal to the second counting rate.

5. The device of claim 1, wherein the processor is configured to perform a method comprising:
calculating a first counting rate associated with the first scintillator and a second counting rate associated with the second scintillator;
determining, from the first counting rate, a first maximum counting rate and a first minimum counting rate;
determining, from the second counting rate, a second maximum counting rate and a second minimum counting rate;
determining a first angle at which the first counting rate is substantially half-way between the first maximum counting rate and the first minimum counting rate;
determining a second angle at which the second counting rate is substantially half-way between the second maximum counting rate and the second minimum counting rate; and
averaging the first angle and the second angle.

6. The device of claim 1, wherein the processor is configured to perform a method comprising:
calculating a first counting rate associated with the first scintillator and a second counting rate associated with the second scintillator;
subtracting the second counting rate from the first counting rate;
fitting the difference so obtained to a predetermined curve formula; and
calculating a particular angle at which the fitted curve passes through zero.

7. The device of claim 1, wherein the processor is configured to perform a method comprising:
orienting the device sequentially at a plurality of detector angles;
at each detector angle, measuring a first counting rate associated with the first scintillator and a second counting rate associated with the second scintillator;
functionally combining the first and second counting rates, thereby deriving a plurality of values associated respectively with the plurality of detector angles wherein each of the plurality of values comprises a functional combination of the first counting rate and the second counting rate at the associated detector angle; and
interpolating between the two highest values of the plurality of values, thereby determining a direction related to the particle.

8. The device of claim 1, wherein the first scintillator and the second scintillator are configured to be directly exposed to the radioactive source, substantially unobstructed by any intervening converter or absorber material.

9. The device of claim 1, wherein:
the first and second scintillators comprise plastic scintillator material;
the third scintillator comprises an inorganic scintillator material; and
the third electrical signal is a measure of the total energy of the particle.

10. The device of claim 4, wherein:
the first indicator comprises a luminous left-pointing arrow;
the second indicator comprises a luminous right-pointing arrow; and
the third indicator comprises a luminous straight-ahead-pointing arrow.

11. The device of claim 7, wherein the functionally combining comprises multiplying the first counting rate times the second counting rate at each detector angle.

12. The device of claim 7, wherein the method further includes:
rotating the device to the particular direction determined by the interpolating;
then measuring additional first and second counting rates;
then functionally combining the additional first and second counting rates, thereby obtaining an additional value; and
calculating an angle by interpolating between the highest two values of the plurality of values and the additional value.

13. The device of claim 5, wherein the method further includes:
rotating the device to the first angle and measuring an updated first scintillator counting rate at the first angle;
rotating the device to the second angle and measuring an updated second scintillator counting rate at the second angle;
determining, from the updated first scintillator counting rate, an updated first angle at which the first scintillator counting rate is substantially half-way between the first maximum counting rate and the first minimum counting rate;

determining, from the updated second scintillator counting rate, an updated second angle at which the second scintillator counting rate is substantially half-way between the second maximum counting rate and the second minimum counting rate; and averaging the updated first angle and the updated second angle.

14. The device of claim 6, wherein the method further includes:

rotating the device to the particular angle at which the fitted curve passes through zero;

measuring the first scintillator counting rate and the second scintillator counting rate at the particular angle;

then subtracting the second counting rate at the particular angle from the first counting rate at the particular angle;

then updating the curve fitting to include the difference so obtained at the particular angle; and then calculating an angle at which the updated curve passes through zero.

15. A device comprising:

a shield comprising a substantially planar body of material that blocks or attenuates a particle from a radioactive source;

a first scintillator comprising a substantially planar body of material that emits a first light pulse responsive to an interaction by the particle in the first scintillator;

a second scintillator comprising a substantially planar body of material that emits a second light pulse responsive to an interaction by the particle in the second scintillator;

one or more light sensors that produce an electrical signal responsive to a light pulse; and a processor comprising an automatic electronic calculation or logic device capable of performing arithmetic calculations according to a preprogrammed method;

wherein:

the first scintillator, the second scintillator, and the shield are all substantially parallel to each other;

the first scintillator is substantially in contact with a first surface of the shield, and the second scintillator is substantially in contact with a second surface of the shield, the second surface being opposite to the first surface;

the light sensors are configured to produce a first electrical signal associated with the first scintillator, and to produce a second electrical signal, distinct from the first electrical signal, associated with the second scintillator;

the processor is configured to determine a direction related to the particle;

the processor is configured to perform a method comprising:

orienting the device sequentially at a plurality of detector angles;

at each detector angle, measuring a first counting rate associated with the first scintillator and a second counting rate associated with the second scintillator;

functionally combining the first and second counting rates, thereby deriving a plurality of values associated respectively with the plurality of detector angles wherein each of the plurality of values comprises a functional combination of the first counting rate and the second counting rate at the associated detector angle;

interpolating between the two highest values of the plurality of values, thereby determining a direction related to the particle; and wherein the functionally combining comprises multiplying the first counting rate times the second counting rate at each detector angle.

16. A device comprising:

a shield comprising a substantially planar body of material that blocks or attenuates a particle from a radioactive source;

a first scintillator comprising a substantially planar body of material that emits a first light pulse responsive to an interaction by the particle in the first scintillator;

a second scintillator comprising a substantially planar body of material that emits a second light pulse responsive to an interaction by the particle in the second scintillator;

one or more light sensors that produce an electrical signal responsive to a light pulse; and a processor comprising an automatic electronic calculation or logic device capable of performing arithmetic calculations according to a preprogrammed method;

wherein:

the first scintillator, the second scintillator, and the shield are all substantially parallel to each other;

the first scintillator is substantially in contact with a first surface of the shield, and the second scintillator is substantially in contact with a second surface of the shield, the second surface being opposite to the first surface;

the light sensors are configured to produce a first electrical signal associated with the first scintillator, and to produce a second electrical signal, distinct from the first electrical signal, associated with the second scintillator;

the processor is configured to determine a direction related to the particle;

the processor is configured to perform a method comprising:

orienting the device sequentially at a plurality of detector angles;

at each detector angle, measuring a first counting rate associated with the first scintillator and a second counting rate associated with the second scintillator;

functionally combining the first and second counting rates, thereby deriving a plurality of values associated respectively with the plurality of detector angles wherein each of the plurality of values comprises a functional combination of the first counting rate and the second counting rate at the associated detector angle;

interpolating between the two highest values of the plurality of values, thereby determining a direction related to the particle;

rotating the device to the particular direction determined by the interpolating;

then measuring additional first and second counting rates;

then functionally combining the additional first and second counting rates, thereby obtaining an additional value; and calculating an angle by interpolating between the highest two values of the plurality of values and the additional value.

* * * * *